United States Patent
Shattil (12)

(10) Patent No.: US 11,115,160 B2
(45) Date of Patent: Sep. 7, 2021

(54) NON-ORTHOGONAL MULTIPLE ACCESS

(71) Applicant: Genghiscomm Holdings, LLC, Boulder, CO (US)

(72) Inventor: Steve Shattil, Cheyenne, WY (US)

(73) Assignee: Genghiscomm Holdings, LLC, Boulder, CO (US)

( * ) Notice: Subject to any disclaimer, the term of this patent is extended or adjusted under 35 U.S.C. 154(b) by 0 days.

(21) Appl. No.: 16/881,810

(22) Filed: May 22, 2020

(65) Prior Publication Data

US 2020/0374054 A1    Nov. 26, 2020

Related U.S. Application Data

(60) Provisional application No. 62/853,051, filed on May 26, 2019.

(51) Int. Cl.
*H04J 99/00* (2009.01)
*H04L 5/00* (2006.01)

(52) U.S. Cl.
CPC ............ *H04L 5/0005* (2013.01); *H04J 15/00* (2013.01)

(58) Field of Classification Search
CPC ................................. H04J 15/00; H04B 1/707
See application file for complete search history.

(56) References Cited

U.S. PATENT DOCUMENTS

| | | | |
|---|---|---|---|
| 4,164,714 A | 8/1979 | Swanson | |
| 4,471,399 A | 9/1984 | Udren | |
| 4,479,226 A | 10/1984 | Prabhu et al. | |
| 4,550,402 A | 10/1985 | Gable et al. | |
| 4,590,511 A | 5/1986 | Bocchi et al. | |
| 4,628,517 A | 12/1986 | Schwarz | |
| 4,700,341 A | 10/1987 | Huang | |
| 4,827,480 A | 5/1989 | Kowalski | |
| 4,912,422 A | 3/1990 | Kobayashi et al. | |
| 4,943,973 A | 7/1990 | Werner | |
| 5,003,545 A | 3/1991 | Kowalski | |

(Continued)

FOREIGN PATENT DOCUMENTS

| | | |
|---|---|---|
| EP | 2763321 A1 | 8/2014 |
| EP | 2449690 B1 | 1/2016 |

(Continued)

OTHER PUBLICATIONS

H. Prakash, C.D.Suriyakala; "PAPR Reduction in MIMO SC-FDMA-A Survey"; Int. J Rec. Adv. Sci. Tech., 2015; 2(2):11-19.

(Continued)

*Primary Examiner* — Hoon J Chung
(74) *Attorney, Agent, or Firm* — Steven J Shattil

(57) ABSTRACT

Systems, methods, and apparatuses for analyzing and synthesizing wireless communication signals are provided. A receiver might transform a received signal into a basis in which the transformed signal is sparse, which can reduce the complexity of joint detection by facilitating message passing algorithm (MPA) decoding. A transmitter might employ dense codewords in a first basis, which may facilitate certain signal-processing operations and may provide a transmission with a low peak-to-average-power ratio. The codewords can be designed to be sparse when transformed to a second basis. The codewords may be configured for non-orthogonal multiple access.

21 Claims, 17 Drawing Sheets

(56) References Cited

U.S. PATENT DOCUMENTS

| | | |
|---|---|---|
| 5,016,242 A | 5/1991 | Tang |
| 5,093,863 A | 3/1992 | Galand et al. |
| 5,125,100 A | 6/1992 | Katznelson |
| 5,191,459 A | 3/1993 | Thompson et al. |
| 5,249,201 A | 9/1993 | Posner et al. |
| 5,282,222 A | 1/1994 | Fattouche et al. |
| 5,309,514 A | 5/1994 | Johnson et al. |
| 5,406,551 A | 4/1995 | Saito et al. |
| 5,410,538 A | 4/1995 | Roche et al. |
| 5,412,648 A | 5/1995 | Fan |
| 5,425,049 A | 6/1995 | Dent et al. |
| 5,457,557 A | 10/1995 | Zarem et al. |
| 5,463,376 A | 10/1995 | Stoffer |
| 5,491,727 A | 2/1996 | Petit |
| 5,504,783 A | 4/1996 | Tomisato et al. |
| 5,519,692 A | 5/1996 | Hershey |
| 5,521,937 A | 5/1996 | Kondo et al. |
| 5,528,581 A | 6/1996 | De Bot |
| 5,533,012 A | 7/1996 | Fukasawa et al. |
| 5,543,806 A | 8/1996 | Wilkinson |
| 5,548,582 A | 8/1996 | Brajal et al. |
| 5,555,268 A | 9/1996 | Fattouche et al. |
| 5,563,906 A | 10/1996 | Hershey et al. |
| 5,579,304 A | 11/1996 | Sugimoto et al. |
| 5,612,978 A | 3/1997 | Blanchard et al. |
| 5,630,154 A | 5/1997 | Bolstad et al. |
| 5,640,698 A | 6/1997 | Shen et al. |
| 5,691,832 A | 11/1997 | Liedenbaum et al. |
| 5,694,393 A | 12/1997 | Kaye |
| 5,704,013 A | 12/1997 | Watari et al. |
| 5,712,716 A | 1/1998 | Vanoli et al. |
| 5,765,097 A | 6/1998 | Dail |
| 5,790,516 A | 8/1998 | Gudmundson et al. |
| 5,793,413 A | 8/1998 | Hylton et al. |
| 5,793,759 A | 8/1998 | Rakib et al. |
| 5,815,801 A | 9/1998 | Hamalainen et al. |
| 5,818,619 A | 10/1998 | Medved et al. |
| 5,822,368 A | 10/1998 | Wang |
| 5,828,658 A | 10/1998 | Ottersten et al. |
| 5,831,977 A | 11/1998 | Dent |
| 5,838,268 A | 11/1998 | Frenkel et al. |
| 5,844,951 A | 12/1998 | Proakis et al. |
| 5,862,189 A | 1/1999 | Huisken et al. |
| 5,931,893 A | 8/1999 | Dent et al. |
| 5,940,196 A | 8/1999 | Piehler et al. |
| 5,940,379 A | 8/1999 | Startup et al. |
| 5,943,332 A | 8/1999 | Liu et al. |
| 5,955,983 A | 9/1999 | Li |
| 5,955,992 A | 9/1999 | Shattil |
| 5,960,032 A | 9/1999 | Letaief et al. |
| 5,991,334 A | 11/1999 | Papadopoulos et al. |
| 6,008,760 A | 12/1999 | Shattil |
| 6,018,317 A | 1/2000 | Dogan et al. |
| 6,047,190 A | 4/2000 | Haleem et al. |
| 6,055,432 A | 4/2000 | Haleem et al. |
| 6,058,105 A | 5/2000 | Hochwald |
| 6,075,812 A | 6/2000 | Cafarella et al. |
| 6,084,871 A | 7/2000 | Engstrom et al. |
| 6,088,351 A | 7/2000 | Jenkin et al. |
| 6,091,967 A | 7/2000 | Kruys et al. |
| 6,097,712 A | 8/2000 | Secord et al. |
| 6,097,773 A | 8/2000 | Carter et al. |
| 6,107,954 A | 8/2000 | Li |
| 6,122,295 A | 9/2000 | Kato et al. |
| 6,128,276 A | 10/2000 | Agee |
| 6,128,350 A | 10/2000 | Shastri et al. |
| 6,130,918 A | 10/2000 | Humphrey et al. |
| 6,141,393 A | 10/2000 | Thomas et al. |
| RE36,944 E | 11/2000 | Li |
| 6,144,711 A | 11/2000 | Raleigh et al. |
| 6,154,443 A | 11/2000 | Huang et al. |
| 6,175,550 B1 | 1/2001 | van Nee et al. |
| 6,175,551 B1 | 1/2001 | Awater et al. |
| 6,178,158 B1 | 1/2001 | Suzuki et al. |
| 6,188,717 B1 | 2/2001 | Kaiser et al. |
| 6,192,068 B1 | 2/2001 | Fattouche et al. |
| 6,208,295 B1 | 3/2001 | Dogan et al. |
| 6,211,671 B1 | 4/2001 | Shattil |
| 6,215,983 B1 | 4/2001 | Dogan et al. |
| 6,233,248 B1 | 5/2001 | Sautter et al. |
| 6,236,642 B1 | 5/2001 | Shaffer et al. |
| 6,240,129 B1 | 5/2001 | Reusens et al. |
| 6,243,565 B1 | 6/2001 | Smith et al. |
| 6,243,581 B1 | 6/2001 | Jawanda |
| 6,252,909 B1 | 6/2001 | Tzannes et al. |
| 6,266,702 B1 | 7/2001 | Darnell et al. |
| 6,282,167 B1 | 8/2001 | Michon et al. |
| 6,292,473 B1 | 9/2001 | Duske et al. |
| 6,301,221 B1 | 10/2001 | Paterson |
| 6,307,892 B1 | 10/2001 | Jones et al. |
| 6,310,704 B1 | 10/2001 | Dogan et al. |
| 6,320,897 B1 | 11/2001 | Fattouche et al. |
| 6,331,837 B1 | 12/2001 | Shattil |
| 6,351,499 B1 | 2/2002 | Paulraj et al. |
| 6,359,923 B1 | 3/2002 | Agee et al. |
| 6,377,566 B1 | 4/2002 | Cupo et al. |
| 6,389,034 B1 | 5/2002 | Guo et al. |
| 6,405,147 B1 | 6/2002 | Fera |
| 6,421,528 B1 | 7/2002 | Rosen et al. |
| 6,434,390 B2 | 8/2002 | Rahman |
| 6,438,173 B1 | 8/2002 | Stantchev et al. |
| 6,442,130 B1 | 8/2002 | Jones, IV et al. |
| 6,442,193 B1 | 8/2002 | Hirsch |
| 6,442,222 B1 | 8/2002 | Ghazi-Moghadam et al. |
| 6,452,981 B1 | 9/2002 | Raleigh et al. |
| 6,459,740 B1 | 10/2002 | Lo |
| 6,463,295 B1 | 10/2002 | Yun |
| 6,470,055 B1 | 10/2002 | Feher |
| 6,473,393 B1 | 10/2002 | Ariyavisitakul et al. |
| 6,473,418 B1 | 10/2002 | Laroia et al. |
| 6,496,290 B1 | 12/2002 | Lee |
| 6,504,862 B1 | 1/2003 | Yang et al. |
| 6,507,319 B2 | 1/2003 | Sikina |
| 6,510,133 B1 | 1/2003 | Uesugi |
| 6,512,737 B1 | 1/2003 | Agee |
| 6,526,105 B1 | 2/2003 | Harikumar et al. |
| 6,532,224 B1 | 3/2003 | Dailey |
| 6,549,581 B1 | 4/2003 | Izumi et al. |
| 6,563,881 B1 | 5/2003 | Sakoda et al. |
| 6,567,482 B1 | 5/2003 | Popovic |
| 6,567,982 B1 | 5/2003 | Howe et al. |
| 6,570,913 B1 | 5/2003 | Chen |
| 6,603,827 B2 | 8/2003 | Bottomley et al. |
| 6,606,351 B1 | 8/2003 | Dapper et al. |
| 6,631,175 B2 | 10/2003 | Harikumar et al. |
| 6,636,495 B1 | 10/2003 | Tangemann |
| 6,650,645 B2 | 11/2003 | Scott et al. |
| 6,654,408 B1 | 11/2003 | Kadous et al. |
| 6,654,719 B1 | 11/2003 | Papadias |
| 6,662,024 B2 | 12/2003 | Walton et al. |
| 6,665,521 B1 | 12/2003 | Gorday et al. |
| 6,667,714 B1 | 12/2003 | Solondz |
| 6,674,810 B1 | 1/2004 | Cheng |
| 6,674,999 B2 | 1/2004 | Ramachandran |
| 6,678,318 B1 | 1/2004 | Lai |
| 6,686,879 B2 | 2/2004 | Shattil |
| 6,687,511 B2 | 2/2004 | McGowan et al. |
| 6,693,984 B1 | 2/2004 | Andre et al. |
| 6,694,154 B1 | 2/2004 | Molnar et al. |
| 6,704,794 B1 | 3/2004 | Kejriwal et al. |
| 6,717,908 B2 | 4/2004 | Vijayan et al. |
| 6,728,295 B1 | 4/2004 | Nallanathan et al. |
| 6,747,946 B1 | 6/2004 | Kaneko et al. |
| 6,751,187 B2 | 6/2004 | Walton et al. |
| 6,757,344 B2 | 6/2004 | Carleton et al. |
| 6,760,373 B2 | 7/2004 | Gross et al. |
| 6,778,514 B1 | 8/2004 | Boccussi et al. |
| 6,785,513 B1 | 8/2004 | Sivaprakasam |
| 6,813,485 B2 | 11/2004 | Sorrells et al. |
| 6,832,251 B1 | 12/2004 | Gelvin et al. |
| 6,850,481 B2 | 2/2005 | Wu et al. |
| 6,859,506 B1 | 2/2005 | McCorkle |
| 6,859,641 B2 | 2/2005 | Collins et al. |
| 6,907,270 B1 | 6/2005 | Blanz |

(56) References Cited

U.S. PATENT DOCUMENTS

| | | |
|---|---|---|
| 6,928,047 B1 | 8/2005 | Xia |
| 6,944,168 B2 | 9/2005 | Paatela et al. |
| 6,980,768 B2 | 12/2005 | Arend et al. |
| 6,982,968 B1 | 1/2006 | Barratt et al. |
| 6,985,533 B2 | 1/2006 | Attallah et al. |
| 6,996,076 B1 | 2/2006 | Forbes et al. |
| 7,010,015 B2 | 3/2006 | Hervey |
| 7,010,048 B1 | 3/2006 | Shattil |
| 7,020,110 B2 | 3/2006 | Walton et al. |
| 7,031,309 B1 | 4/2006 | Sautter et al. |
| 7,031,371 B1 | 4/2006 | Lakkis |
| 7,035,661 B1 | 4/2006 | Yun |
| 7,057,555 B2 | 6/2006 | Lewis |
| 7,075,999 B2 | 7/2006 | Redfern |
| 7,076,168 B1 | 7/2006 | Shattil |
| 7,082,153 B2 | 7/2006 | Balachandran et al. |
| 7,099,268 B2 | 8/2006 | Ichihara et al. |
| 7,139,321 B2 | 11/2006 | Giannakis et al. |
| 7,149,211 B2 | 12/2006 | Bennett et al. |
| 7,154,936 B2 | 12/2006 | Bjerke et al. |
| 7,155,255 B2 | 12/2006 | Blum et al. |
| 7,158,504 B2 | 1/2007 | Kadaba et al. |
| 7,194,766 B2 | 3/2007 | Noehring et al. |
| 7,197,084 B2 | 3/2007 | Ketchum et al. |
| 7,263,133 B1 | 8/2007 | Miao |
| 7,283,799 B2 | 10/2007 | Shattil |
| 7,286,604 B2 | 10/2007 | Shattil |
| 7,295,509 B2 | 11/2007 | Laroia et al. |
| 7,317,750 B2 | 1/2008 | Shattil |
| 7,376,074 B2 | 5/2008 | Jung et al. |
| 7,391,804 B2 | 6/2008 | Shattil |
| 7,406,261 B2 | 7/2008 | Shattil |
| 7,418,043 B2 | 8/2008 | Shattil |
| 7,430,257 B1 | 9/2008 | Shattil |
| 7,469,013 B1 | 12/2008 | Bolt et al. |
| 7,508,798 B2 | 3/2009 | Tong et al. |
| 7,570,956 B2 | 8/2009 | Bigham et al. |
| 7,594,010 B2 | 9/2009 | Dohler et al. |
| 7,606,137 B2 | 10/2009 | Shattil |
| 7,787,514 B2 | 8/2010 | Shattil |
| 7,801,247 B2 | 9/2010 | Onggosanusi et al. |
| 7,876,729 B1 | 1/2011 | Grilli et al. |
| 7,907,588 B2 | 3/2011 | Schaepperle et al. |
| 8,102,907 B2 | 1/2012 | Kim |
| 8,107,965 B2 | 1/2012 | Hui et al. |
| 8,284,757 B2 | 10/2012 | Berggren |
| 8,301,139 B2 | 10/2012 | Lotze et al. |
| 8,320,301 B2 | 11/2012 | Walton et al. |
| 8,345,693 B1 | 1/2013 | Kim |
| 8,363,739 B2 | 1/2013 | Ma et al. |
| 8,391,913 B2 | 3/2013 | Zimmer et al. |
| 8,396,153 B1 | 3/2013 | Shen et al. |
| 8,416,837 B2 | 4/2013 | Wu et al. |
| 8,472,335 B2 | 6/2013 | De Pasquale et al. |
| 8,498,647 B2 | 7/2013 | Gorokhov et al. |
| 8,526,400 B2 | 9/2013 | Tong et al. |
| 8,670,390 B2 | 3/2014 | Shattil |
| 8,780,830 B2 | 7/2014 | Doppler et al. |
| 8,885,628 B2 | 10/2014 | Palanki et al. |
| 8,929,550 B2 | 1/2015 | Shattil |
| 8,942,082 B2 | 1/2015 | Shattil |
| 8,976,838 B2 | 3/2015 | Jaeckel et al. |
| 9,025,684 B2 | 5/2015 | Jeong et al. |
| 9,026,790 B2 | 5/2015 | Bolton et al. |
| 9,042,468 B2 | 5/2015 | Barbu et al. |
| 9,130,810 B2 | 9/2015 | Laroia et al. |
| 9,210,020 B1 | 12/2015 | Guillemette |
| 9,225,471 B2 | 12/2015 | Shattil |
| 9,485,063 B2 | 11/2016 | Shattil |
| 9,584,206 B2 | 2/2017 | Kim et al. |
| 9,628,231 B2 | 4/2017 | Shattil |
| 9,693,339 B2 | 6/2017 | Palanki et al. |
| 9,712,272 B2 | 7/2017 | Zhu et al. |
| 9,768,842 B2 | 9/2017 | Shattil |
| 9,798,329 B2 | 10/2017 | Shattil |
| 9,800,448 B1 | 10/2017 | Shattil |
| 9,819,449 B2 | 11/2017 | Shattil |
| 9,831,936 B2 | 11/2017 | Kim et al. |
| 9,942,013 B2 | 4/2018 | Malladi et al. |
| 10,003,486 B2 | 6/2018 | Zhu et al. |
| 10,090,978 B2 | 10/2018 | Sun et al. |
| 10,117,120 B2 | 10/2018 | Sun et al. |
| 10,148,332 B2 | 12/2018 | Stirling-Gallacher et al. |
| 10,149,318 B2 | 12/2018 | Sun et al. |
| 10,181,934 B2 | 1/2019 | Chen et al. |
| 10,211,892 B2 | 2/2019 | Shattil |
| 10,257,791 B2 | 4/2019 | Hojeij et al. |
| 10,263,660 B2 | 4/2019 | Sun et al. |
| 10,285,169 B2 | 5/2019 | Sun et al. |
| 10,320,427 B2 | 6/2019 | Ueng et al. |
| 10,326,560 B2 | 6/2019 | Kim et al. |
| 10,396,930 B2 | 8/2019 | Jung et al. |
| 10,425,198 B2 | 9/2019 | Baligh et al. |
| 10,432,345 B2 | 10/2019 | Shin et al. |
| 10,447,518 B2 | 10/2019 | Bayesteh et al. |
| 10,461,910 B1 | 10/2019 | Nammi et al. |
| 10,516,554 B2 | 12/2019 | Rajatheva |
| 10,523,324 B2 | 12/2019 | Cheng et al. |
| 10,523,383 B2 | 12/2019 | Ma et al. |
| 10,523,482 B2 | 12/2019 | Chaudhuri et al. |
| 10,548,115 B2 | 1/2020 | Lee et al. |
| 10,554,353 B2 | 2/2020 | Zhao et al. |
| 10,560,959 B2 | 2/2020 | Kumar et al. |
| 10,568,143 B2 | 2/2020 | Delfeld et al. |
| 10,574,315 B2 | 2/2020 | Lee et al. |
| 10,587,999 B2 | 3/2020 | Gitlin et al. |
| 10,602,507 B2 | 3/2020 | Nammi et al. |
| 10,608,850 B2 | 3/2020 | Hormati et al. |
| 10,623,069 B2 | 4/2020 | Bayesteh et al. |
| 10,630,455 B2 | 4/2020 | Shieh et al. |
| 10,630,512 B2 | 4/2020 | Eroz et al. |
| 10,630,513 B2 | 4/2020 | Lei et al. |
| 10,637,606 B2 | 4/2020 | Shin et al. |
| 10,651,961 B2 | 5/2020 | Sun et al. |
| 10,651,988 B2 | 5/2020 | Kim et al. |
| 10,660,093 B2 | 5/2020 | Schellmann et al. |
| 10,666,374 B2 | 5/2020 | Nammi et al. |
| 10,700,912 B2 | 6/2020 | Herath et al. |
| 10,701,685 B2 | 6/2020 | Abdoli et al. |
| 10,708,888 B2 | 7/2020 | Ren et al. |
| 10,721,114 B2 | 7/2020 | Herath et al. |
| 10,727,897 B2 | 7/2020 | Gau et al. |
| 10,736,081 B2 | 8/2020 | Wu et al. |
| 10,736,138 B2 | 8/2020 | Lee et al. |
| 10,756,932 B2 | 8/2020 | Lee et al. |
| 2002/0009096 A1 | 1/2002 | Odenwalder |
| 2002/0034191 A1 | 3/2002 | Shattil |
| 2002/0044524 A1 | 4/2002 | Laroia et al. |
| 2002/0051433 A1 | 5/2002 | Affes et al. |
| 2002/0061068 A1 | 5/2002 | Leva et al. |
| 2002/0118727 A1 | 8/2002 | Kim et al. |
| 2002/0118781 A1 | 8/2002 | Thomas et al. |
| 2002/0127978 A1 | 9/2002 | Khatri |
| 2002/0137472 A1 | 9/2002 | Quinn et al. |
| 2002/0168016 A1 | 11/2002 | Wang et al. |
| 2002/0172184 A1 | 11/2002 | Kim et al. |
| 2002/0172213 A1 | 11/2002 | Laroia et al. |
| 2002/0181509 A1 | 12/2002 | Mody et al. |
| 2002/0193146 A1 | 12/2002 | Wallace et al. |
| 2002/0196733 A1 | 12/2002 | Shen et al. |
| 2003/0026222 A1 | 2/2003 | Kotzin |
| 2003/0043732 A1 | 3/2003 | Walton et al. |
| 2003/0072380 A1 | 4/2003 | Huang |
| 2003/0086363 A1 | 5/2003 | Hernandes |
| 2003/0128658 A1 | 7/2003 | Walton et al. |
| 2003/0133469 A1 | 7/2003 | Brockmann et al. |
| 2003/0147655 A1 | 8/2003 | Shattil |
| 2003/0154262 A1 | 8/2003 | Kaiser et al. |
| 2003/0169824 A1 | 9/2003 | Chayat |
| 2003/0206527 A1 | 11/2003 | Yim |
| 2003/0218973 A1 | 11/2003 | Oprea et al. |
| 2004/0013101 A1 | 1/2004 | Akin et al. |
| 2004/0017824 A1 | 1/2004 | Koenck |
| 2004/0047405 A1 | 3/2004 | Boesel et al. |

(56) References Cited

U.S. PATENT DOCUMENTS

| | | |
|---|---|---|
| 2004/0057501 A1 | 3/2004 | Balachandran et al. |
| 2004/0086027 A1 | 5/2004 | Shattil |
| 2004/0100897 A1 | 5/2004 | Shattil |
| 2004/0141548 A1 | 7/2004 | Shattil |
| 2004/0151109 A1 | 8/2004 | Batra et al. |
| 2004/0223476 A1 | 11/2004 | Jose et al. |
| 2004/0243258 A1 | 12/2004 | Shattil |
| 2005/0058098 A1 | 3/2005 | Klein et al. |
| 2005/0075081 A1 | 4/2005 | Catreux-Erceg et al. |
| 2005/0078742 A1 | 4/2005 | Cairns et al. |
| 2005/0198199 A1 | 9/2005 | Dowling |
| 2005/0255808 A1 | 11/2005 | Ahmed et al. |
| 2005/0259627 A1 | 11/2005 | Song et al. |
| 2005/0265275 A1 | 12/2005 | Howard et al. |
| 2005/0265293 A1 | 12/2005 | Ro et al. |
| 2005/0270968 A1 | 12/2005 | Feng et al. |
| 2005/0286476 A1 | 12/2005 | Crosswy et al. |
| 2006/0023803 A1 | 2/2006 | Perlman et al. |
| 2006/0057958 A1 | 3/2006 | Ngo et al. |
| 2006/0153283 A1 | 7/2006 | Scharf et al. |
| 2006/0262870 A1 | 11/2006 | Khan |
| 2007/0041311 A1 | 2/2007 | Baum et al. |
| 2007/0041404 A1 | 2/2007 | Palanki et al. |
| 2007/0071125 A1 | 3/2007 | Tan et al. |
| 2007/0081580 A1 | 4/2007 | Breiling |
| 2007/0078924 A1 | 5/2007 | Hassan et al. |
| 2007/0140102 A1 | 6/2007 | Oh et al. |
| 2007/0160014 A1 | 7/2007 | Larsson |
| 2007/0177681 A1 | 8/2007 | Choi et al. |
| 2007/0183386 A1 | 8/2007 | Muharemovic et al. |
| 2007/0211807 A1 | 9/2007 | Han et al. |
| 2008/0095121 A1 | 4/2008 | Shattil |
| 2008/0151743 A1 | 6/2008 | Tong et al. |
| 2008/0298502 A1 | 12/2008 | Xu et al. |
| 2008/0310484 A1 | 12/2008 | Shattil |
| 2009/0092182 A1 | 4/2009 | Shin et al. |
| 2009/0110033 A1 | 4/2009 | Shattil |
| 2009/0147870 A1 | 6/2009 | Lin et al. |
| 2009/0156252 A1 | 6/2009 | Harris |
| 2009/0274103 A1 | 11/2009 | Yang et al. |
| 2009/0304108 A1 | 12/2009 | Kwon et al. |
| 2010/0039928 A1 | 2/2010 | Noh et al. |
| 2010/0041350 A1 | 2/2010 | Zhang et al. |
| 2010/0056200 A1 | 3/2010 | Tolonen |
| 2010/0080112 A1 | 4/2010 | Bertrand et al. |
| 2010/0091919 A1 | 4/2010 | Xu et al. |
| 2010/0098042 A1 | 4/2010 | Dent |
| 2010/0110875 A1 | 5/2010 | No et al. |
| 2010/0165829 A1 | 7/2010 | Narasimha et al. |
| 2010/0184369 A1 | 7/2010 | Cho et al. |
| 2010/0185541 A1 | 7/2010 | Hassan et al. |
| 2010/0254484 A1 | 10/2010 | Hamaguchi et al. |
| 2010/0254497 A1 | 10/2010 | To et al. |
| 2010/0317343 A1 | 12/2010 | Krishnamurthy et al. |
| 2011/0041021 A1 | 2/2011 | Khoshnevis et al. |
| 2011/0096658 A1 | 4/2011 | Yang et al. |
| 2011/0135016 A1 | 6/2011 | Ahn et al. |
| 2011/0206207 A1 | 8/2011 | Priotti |
| 2011/0228878 A1 | 9/2011 | Sorrentino |
| 2011/0281534 A1 | 11/2011 | Liao et al. |
| 2012/0014392 A1 | 1/2012 | Bhushan et al. |
| 2012/0057660 A1 | 3/2012 | Nguyen et al. |
| 2012/0087393 A1 | 4/2012 | Jeong et al. |
| 2012/0113816 A1 | 5/2012 | Bhattad et al. |
| 2012/0188994 A1 | 7/2012 | Palanki et al. |
| 2012/0213054 A1 | 8/2012 | Hamaguchi et al. |
| 2012/0224517 A1 | 9/2012 | Yun et al. |
| 2012/0250740 A1 | 10/2012 | Ling |
| 2012/0252387 A1 | 10/2012 | Haskins et al. |
| 2012/0269285 A1 | 10/2012 | Jeong et al. |
| 2012/0294346 A1 | 11/2012 | Kolze |
| 2013/0058239 A1 | 3/2013 | Wang et al. |
| 2013/0077508 A1 | 3/2013 | Axmon et al. |
| 2013/0142275 A1 | 6/2013 | Baik et al. |
| 2013/0315211 A1 | 11/2013 | Balan et al. |
| 2014/0064392 A1 | 3/2014 | Jonsson et al. |
| 2014/0086186 A1 | 3/2014 | Hamaguchi et al. |
| 2014/0140360 A1 | 5/2014 | Nikopour et al. |
| 2014/0198863 A1 | 7/2014 | Terry |
| 2014/0348253 A1 | 11/2014 | Mobasher et al. |
| 2015/0009971 A1 | 1/2015 | Han et al. |
| 2015/0043540 A1 | 2/2015 | Nikopour et al. |
| 2015/0103723 A1 | 4/2015 | Kim et al. |
| 2015/0195840 A1 | 7/2015 | Ahn et al. |
| 2015/0271000 A1 | 9/2015 | Yang et al. |
| 2015/0282185 A1 | 10/2015 | Nikopour et al. |
| 2015/0304153 A1 | 10/2015 | Moffatt et al. |
| 2015/0358190 A1 | 12/2015 | Kruglick et al. |
| 2016/0006594 A1 | 1/2016 | Persson et al. |
| 2016/0050039 A1 | 2/2016 | Ma et al. |
| 2016/0050096 A1 | 2/2016 | DelMarco |
| 2016/0050099 A1 | 2/2016 | Siohan et al. |
| 2016/0119073 A1 | 4/2016 | Vilaipornsawai et al. |
| 2016/0134400 A1 | 5/2016 | Yi et al. |
| 2016/0191216 A1 | 6/2016 | Ma et al. |
| 2016/0197756 A1 | 7/2016 | Mestdagh et al. |
| 2016/0254889 A1 | 9/2016 | Shattil |
| 2016/0254937 A1 | 9/2016 | Bayesteh et al. |
| 2016/0269083 A1 | 9/2016 | Porat et al. |
| 2016/0270042 A1 | 9/2016 | Nikopour et al. |
| 2016/0277156 A1 | 9/2016 | Bayesteh et al. |
| 2016/0286529 A1 | 9/2016 | Ma et al. |
| 2016/0295589 A1 | 10/2016 | Nikopour et al. |
| 2016/0353446 A1 | 12/2016 | Abdoli et al. |
| 2017/0019222 A1 | 1/2017 | Ge et al. |
| 2017/0019284 A1 | 1/2017 | Ankarali et al. |
| 2017/0026218 A1 | 1/2017 | Shattil |
| 2017/0034845 A1 | 2/2017 | Liu et al. |
| 2017/0054480 A1 | 2/2017 | Shattil |
| 2017/0126454 A1 | 5/2017 | Huan et al. |
| 2017/0126455 A1 | 5/2017 | Vilaipornsa et al. |
| 2017/0126458 A1 | 5/2017 | Shattil |
| 2017/0127423 A1 | 5/2017 | Boroujeni et al. |
| 2017/0134202 A1 | 5/2017 | Baligh et al. |
| 2017/0134235 A1 | 5/2017 | Wu et al. |
| 2017/0201406 A1 | 7/2017 | Wu et al. |
| 2017/0244535 A1 | 8/2017 | Islam et al. |
| 2017/0250848 A1 | 8/2017 | Lee et al. |
| 2017/0251479 A1 | 8/2017 | Abdoli et al. |
| 2017/0257204 A1 | 9/2017 | Shi et al. |
| 2017/0264474 A1 | 9/2017 | He et al. |
| 2017/0272210 A1 | 9/2017 | Zhang |
| 2017/0279648 A1 | 9/2017 | Song et al. |
| 2017/0289920 A1 | 10/2017 | Liu et al. |
| 2017/0289984 A1 | 10/2017 | Baligh et al. |
| 2017/0295000 A1 | 10/2017 | Yoo et al. |
| 2017/0295500 A1 | 10/2017 | Sun et al. |
| 2017/0302500 A1 | 10/2017 | Lu et al. |
| 2017/0317799 A1 | 11/2017 | Yi et al. |
| 2017/0353340 A1 | 12/2017 | Raphaeli et al. |
| 2018/0013526 A1 | 1/2018 | Bayesteh et al. |
| 2018/0048349 A1 | 2/2018 | Sun et al. |
| 2018/0054334 A1 | 2/2018 | Sun et al. |
| 2018/0062904 A1 | 3/2018 | Hwang et al. |
| 2018/0091338 A1 | 3/2018 | Mayer et al. |
| 2018/0092086 A1 | 3/2018 | Nammi et al. |
| 2018/0109408 A1 | 4/2018 | Sandell et al. |
| 2018/0123763 A1 | 5/2018 | Yu |
| 2018/0124715 A1 | 5/2018 | Xu et al. |
| 2018/0145790 A1 | 5/2018 | Xu et al. |
| 2018/0167244 A1 | 6/2018 | Cheng et al. |
| 2018/0191543 A1 | 7/2018 | Park et al. |
| 2018/0192439 A1 | 7/2018 | Tang et al. |
| 2018/0205591 A1 | 7/2018 | Wang et al. |
| 2018/0212809 A1 | 7/2018 | Bakulin et al. |
| 2018/0212810 A1 | 7/2018 | Park et al. |
| 2018/0288809 A1 | 10/2018 | Delfeld et al. |
| 2018/0309609 A1 | 10/2018 | Zhu et al. |
| 2019/0020520 A1 | 1/2019 | Bakulin et al. |
| 2019/0036657 A1 | 1/2019 | Zhao et al. |
| 2019/0158338 A1* | 5/2019 | Herath .............. H04L 5/003 |
| 2019/0173556 A1 | 6/2019 | Zhou et al. |
| 2019/0182307 A1 | 6/2019 | Abdoli et al. |
| 2019/0190753 A1* | 6/2019 | Bayesteh ............ H04J 13/0077 |

(56) References Cited

U.S. PATENT DOCUMENTS

| | | |
|---|---|---|
| 2020/0052820 A1 | 2/2020 | Chen et al. |
| 2020/0053789 A1 | 2/2020 | Lee et al. |
| 2020/0127715 A1 | 4/2020 | Sheng et al. |
| 2020/0153570 A1 | 5/2020 | Peng et al. |

FOREIGN PATENT DOCUMENTS

| | | |
|---|---|---|
| JP | H08331093 | 12/1996 |
| JP | 2012-100323 | 5/2012 |
| KR | 10-2010-0019974 | 2/2010 |
| WO | 0237771 | 5/2002 |

OTHER PUBLICATIONS

E. Hajlaoui, M. Abdellaoui; "SOCP Approach for Reducing PAPR for MIMO-OFDM Via Tone Reservation"; International Journal of Distributed and Parallel Systems (IJDPS) vol. 2, No. 3, May 2011.

J. Shin, B. Seo; "PAPR Reduction Scheme for MISO and MIMO OFDM Systems with Limited Feedback"; WSEAS Transactions on Communications 13:355-362—Jan. 2014.

D. Sinanovic, et al.; "Low PAPR Spatial Modulation for SC-FDMA"; IEEE Transactions on Vehicular Technology; vol. 66, Issue: 1, Jan. 2017.

G.H. Karande, et al.; "Peak-to-Average Power Reduction in MIMO-OFDM Systems using SLM technique"; IPASJ International Journal of Electronics & Communication (IIJEC); vol. 2, Issue 8, Aug. 2014.

M. Lieberei, U. Zolzer; "Time Domain PAPR Reduction in MIMO-OFDM Spatial Multiplexing Systems"; in Proceedings of the 14th International OFDM-Workshop (InOWo'09), S. 218-222, 2009.

M. Vu, A. Paulraj; "MIMO Wireless Linear Precoding"; IEEE Signal Processing Magazine. Submitted Feb. 2006, revised Nov. 2006 and Dec. 2006.

H.G. Myung, et al.; "Peak Power Characteristics of Single Carrier FDMA MIMO Precoding System"; 2007 IEEE 66th Vehicular Technology Conference, Sep. 30-Oct. 3, 2007.

B. Naik, et al.; "Reduction of PAPR in MIMO-OFDM/A System Using Polyphase Complementary Modulation"; International Journal of Innovative Research in Computer and Communication Engineering; vol. 2, Issue 5, May 2014.

A.S. Parihar, A. Rai; "A Review: PAPR Reduction Techniques in MIMO OFDM System"; International Journal of Engineering and Innovative Technology (IJEIT); vol. 4, Issue 12, Jun. 2015.

B. Rihawi, Y.Louet; "PAPR Reduction Scheme with SOCP for MIMO-OFDM Systems"; I. J. Communications, Network and System Sciences. 2008; 1: 1-103; Published Online Feb. 2008 in SciRes (http://www.SRPublishing.org/journal/ijcns/).

C.A. Devlin, et al.; "Peak to Average Power Ratio Reduction Technique for OFDM Using Pilot Tones and Unused Carriers"; 2008 IEEE Radio and Wireless Symposium; Year: 2008; pp. 33-36.

K Mhatre, U.P. Khot; "Efficient Selective Mapping PAPR Reduction Technique"; International Conference on Advanced Computing Technologies and Applications (ICACTA-2015); Procedia Computer Science 45 ( 2015 ) 620-627.

K. Srinivasarao, et al.; "Peak-to-Average Power Reduction in MIMO-OFDM Systems Using Sub-optimal Algorithm"; International Journal of Distributed and Parallel Systems (IJDPS) vol. 3, No. 3, May 2012.

K. Xu, et al.; "Beamforming MISO-OFDM PAPR Reduction: A Space-User Perspective"; 2007 IEEE International Conference on Acoustics, Speech and Signal Processing—ICASSP '07, Apr. 15-20, 2007.

H. Zhang, D.L. Goeckel; "Peak Power Reduction in Closed-Loop MIMO-OFDM, Systems via Mode Reservation"; IEEE Communications Letters, vol. 11, No. 7, Jul. 2007.

C.L. Wang, Y. Ouyang; "Low-Complexity Selected Mapping Schemes for Peak-to-Average Power Ratio Reduction in OFDM Systems"; IEEE Transactions on Signal Processing, vol. 53, No. 12, Dec. 2005.

P. Sindhu, G. Krishnareddy; "Peak and Average Power Reduction in OFDM System with Trellis Shaping Method"; International Journal of Advanced Research in Electrical, Electronics and Instrumentation Engineering; vol. 6, Issue 7, Jul. 2017.

H-B Jeon, et al.; "Bit-Based SLM Schemes for PAPR Reduction in QAM Modulated OFDM Signals"; IEEE Transactions on Broadcasting, vol. 55, No. 3, Sep. 2009.

H-B Jeon, et al.; "A Low-Complexity SLM Scheme Using Additive Mapping Sequences for PAPR Reduction of OFDM Signals"; IEEE Transactions on Broadcasting, vol. 57, No. 4, Dec. 2011.

S-J Heo, et al.; "A Modified SLM Scheme With Low Complexity for PAPR Reduction of OFDM Systems"; IEEE Transactions on Broadcasting, vol. 53, No. 4, Dec. 2007.

M.I. Abdullah, et al.; "Comparative Study of PAPR Reduction Techniques in OFDM"; ARPN Journal of Systems and Software; vol. 1, No. 8, Nov. 2011.

E. Abdullah, et al.; "Modified selective mapping scheme with low complexity for minimizing high peakaverage power ratio in orthogonal frequency division multiplexing system"; AIP Conference Proceedings 1774, 050005 (2016).

S.T. O'Hara, J.R. Periard; "Orthogonal-Coded Selective Mapping (OCSM) for OFDM Peakto-Average Power Reduction Without Side Information"; Proceeding of the SDR 04 Technical Conference and Product Exposition 2004, Syracuse, NY, Technology Center—Syracuse Research Corporation. 2004.

P. Sharma, S. Verma; "PAPR Reduction of OFDM Signals Using Selective Mapping With Turbo Codes"; International Journal of Wireless & Mobile Networks (IJWMN) vol. 3, No. 4, Aug. 2011.

D. Wiegandt et al., "Overcoming peak-to-average power ratio issues in OFDM via carrier-interferometry codes", VTC 2001 Fall. IEEE VTS 54th Vehicular Technology Conference, 2001, vol. 2, pp. 660-663, Oct. 7-11, 2001.

B. Natarajan, et al. "Crest factor considerations in MC-CDMA with carrier interferometry codes", PACRIM. 2001 IEEE Communications Pacific Rim Conference on Computers and signal Processing, 2001, vol. 2, pp. 445-448 Aug. 26-28, 2001.

C.R. Nassar et al., "High-Performance Broadband DS-CDMA via Carrier Interferometry Chip Shaping," 2000 Int'l Symposium on Advanced Radio Technologies, Boulder, CO, Sep. 6-8, 2000.

C.R. Nassar, B. Natarajan, S. Shattil, "Introduction of carrier interference to spread spectrum multiple access," Wireless Communications and Systems, 1999 Emerging Technologies Symposium Apr. 12-13, 1999 pp. 4.1-4.5.

B. Natarajan, C.R. Nassar, S. Shattil, M. Michelini, and Z. Wu; "High-Performance MC-CDMA Via Carrier Interferometry Codes," Vehicular Technology, IEEE Transactions on; vol. 50, Issue 6, Nov. 2001, pp. 1344-1353.

Z. Wu, B. Natarajan, C.R. Nassar, S. Shattil; "High-performance, high-capacity MC-CDMA via carrier interferometry," Personal, Indoor and Mobile Radio Communications, 2001 12th IEEE International Symposium on; vol. 2, Sep. 30-Oct. 3, 2001 pp. G-11-G-16.

S.A. Zekavat, C.R. Nassar, S. Shattil; "The merger of a single oscillating-beam smart antenna and MC-CDMA: transmit diversity, frequency diversity and directionality," Broadband Communications for the Internet Era Symposium digest, 2001 IEEE Emerging Technologies Symposium on Sep. 10-11, 2001 pp. 107-112.

B. Natarajan, C.R. Nassar, S. Shattil; "Enhanced Bluetooth and IEEE 802.11 (FH) via multi-carrier implementation of the physical layer," Broadband Communications for the Internet Era Symposium digest, 2001 IEEE Emerging Technologies Symposium on; Sep. 10-11, 2001 pp. 129-133.

Z. Wu; C.R. Nassar, S. Shattil; "Ultra wideband DS-CDMA via innovations in chip shaping," Vehicular Technology Conference, 2001. VTC 2001 Fall. IEEE VTS 54th; vol. 4, Oct. 7-11, 2001 pp. 2470-2474.

B. Natarajan, C.R. Nassar, S. Shattil; "Innovative pulse shaping for high-performance wireless TDMA," Communications Letters, IEEE vol. 5, Issue 9, Sep. 2001 pp. 372-374.

B. Natarajan, C.R. Nassar and S.Shattil; "Throughput Enhancement in TDMA through Carrier Interference Pulse Shaping," IEEE Vehicular technology Conference Proceedings, vol. 4, Fall 2000, Boston, Sep. 24-28, 2000, pp. 1799-1803.

(56) References Cited

OTHER PUBLICATIONS

V. Thippavajjula, B.Natarajan; "Parallel Interference Cancellation Techniques for Synchronous Carrier Interferometry/MC-CDMA Uplink"; IEEE 60th Vehicular Technology Conference, 2004. VTC2004-Fall. Sep. 26-29, 2004.

A. Serener, et al.; "Performance of Spread OFDM with LDPC Coding in Outdoor Environments"; 2003 IEEE 58th Vehicular Technology Conference. VTC 2003-Fall (IEEE Cat. No. 03CH37484), Oct. 6-9, 2003.

LTE: Evolved Universal Terrestrial Radio Access (E-UTRA); Multiplexing and channel coding (3GPP TS 36.212 version 8.8.0 Release 8), Jan. 2010.

LTE: Evolved Universal Terrestrial Radio Access (E-UTRA); Physical channels and modulation (3GPP TS 36.211 version 8.7.0 Release 8), Jun. 2009.

B. Natarajan, C.R. Nassar and S.Shattil; "CI/FSK: Bandwidth-Efficient Multicarrier FSK for High Performance, High Throughput, and Enhanced Applicability"; IEEE Transactions on Communications, vol. 52, No. 3, Mar. 2004.

G. Wunder, K.G. Paterson; "Crest-Factor Analysis of Carrier Interferometry MC-CDMA and OFDM systems"; International Symposium onInformation Theory, 2004. ISIT 2004. Proceedings. Jun. 27-Jul. 2, 2004.

B.Natarajan, C.R. Nassar "Crest Factor Reduction in MC-CDMA Employing Carrier Interferometry Codes"; EURSAP Journal on Wireless Comm. and Networking 2004:2, 374-379.

A.J. Best, B.Natarajan; "The Effect of Jamming on the Performance of Carrier Interferometry/OFDM"; WiMob'2005), IEEE International Conference on Wireless And Mobile Computing, Networking And Communications, 2005. Aug. 22-24, 2005.

S. Hijazi, et al.; "Enabling FCC's Proposed Spectral Policy via Carrier Interferometry"; 2004 IEEE Wireless Communications and Networking Conference (IEEE Cat No. 04TH8733). Mar. 21-25, 2004.

Z. Wu, et al.; "FD-MC-CDMA: A Frequency-based Multiple Access Architecture for High Performance Wireless Communication"; Proceedings RAWCON 2001. 2001 IEEE Radio and Wireless Conference (Cat.No. 01EX514). Aug. 19-22, 2001.

P. Barbosa, et al.; "High-Performance MIMO-OFDM via Carrier Interferometry"; GLOBECOM '03. IEEE Global Telecommunications Conference (IEEE Cat. No. 03CH37489). Dec. 1-5, 2003.

D.A. Wiegandt, C.R. Nassar; "High-Throughput, High-Performance OFDM via Pseudo-Orthogonal Carrier Interferometry"; 12th IEEE International Symposium on Personal, Indoor and Mobile Radio Communications. PIMRC 2001. Proceedings (Cat. No. 01TH8598) Oct. 3-Sep. 30, 2001.

D.A. Wiegandt, C.R. Nassar; "High-Throughput, High-Performance OFDM via Pseudo-Orthogonal Carrier Interferometry Type 2"; The 5th International Symposium on Wireless Personal Multimedia Communications. Oct. 27-30, 2002.

D.A. Wiegandt, C.R. Nassar; "High-Throughput, High-Performance OFDM via Pseudo-Orthogonal Carrier Interferometry Spreading Codes"; IEEE Transactions on Communications, vol. 51, No. 7, pp. 1123-1134. Jul. 2003.

T. Dias, R.C. de Lamare; "Study of Unique-Word Based GFDM Transmission Systems"; https://arxiv.org/pdf/1805.10702.pdf, May 27, 2018.

R. Ferdian, et al.; "Efficient Equalization Hardware Architecture for SC-FDMA Systems without Cyclic Prefix"; 2012 International Symposium on Communications and Information Technologies (ISCIT): pp. 936-941, Oct. 2012.

M. Au, et al.; "Joint Code-Frequency Index Modulation for IoT and Multi-User Communications"; IEEE Journal of Selected Topics in Signal Processing (vol. 13, Issue: 6, Oct. 2019).

D.A. Wiegandt, C.R. Nassar; "Higher-Speed, Higher-Performance 802.11a Wireless LAN via Carrier-Interferometry Orthogonal Frequency Division Multiplexing"; 2002 IEEE International Conference on Communications. Conference Proceedings. ICC 2002 (Cat No. 02CH37333). Apr. 28-May 2, 2002.

Z. Wu, et al.; "High-Performance 64-QAM OFDM via Carrier Interferometry Spreading Codes"; 2003 IEEE 58th Vehicular Technology Conference. VTC 2003-Fall (IEEE Cat. No. 03CH37484). Oct. 6-9, 2003.

B.Natarajan, C.R. Nassar and S.Shattil; "High-Throughput High-Performance TDMA Through Pseudo-Orthogonal Carrier Interferometry Pulse Shaping"; IEEE Transactions on Wireless Communications, vol. 3, No. 3, May 2004.

B.Natarajan, C.R. Nassar; "Introducing Novel FDD and FDM in MC-CDMA to Enhance Performance"; RAWCON 2000. 2000 IEEE Radio and Wireless Conference (Cat. No. 00EX404). 13-13 Sep. 2000.

B.Natarajan, Z Wu, C.R. Nassar and S.Shattil; "Large Set of CI Spreading Codes for High-Capacity MC-CDMA"; IEEE Transactions on Communications, vol. 52, No. 11, Nov. 2004.

B.Natarajan, C.R. Nassar, Z Wu; "Multi-carrier platform for wireless communications. Part 1: High-performance, high-throughput TDMA and DS-CDMA via multi-carrier implementations"; Wireless Communications and Mobile Computing; Wirel. Commun. Mob. Comput. 2002; 2:357-379 (DOI: 10.1002/wcm.51) Jun. 18, 2002.

S.A. Zekavat, C.R. Nassar and S.Shattil; "Merging Multicarrier CDMA and Oscillating-Beam Smart Antenna Arrays: Exploiting Directionality, Transmit Diversity, and Frequency Diversity"; IEEE Transactions on Communications, vol. 52, No. 1, pp. 110-119, Jan. 2004.

C.R. Nassar, B.Natarajan, Z. Wu, D. Wiegandt, and S.Shattil; Multi-Carrier Technologies for Wireless Communication; Kluwer Academic Publishers 2002.

B.Natarajan, C.R. Nassar, S. Shattil; "Novel Multi-Carrier Implementation of FSK for Bandwidth Efficient, High Performance Wireless Systems"; 2002 IEEE International Conference on Communications. Conference Proceedings. ICC 2002 (Cat. No. 02CH37333) Apr. 28-May 2, 2002.

D.A. Wiegandt, C.R. Nassar, Z. Wu; "Overcoming Peak-to-Average Power Ratio Issues in OFDM via Carrier-Interferometry Codes"; IEEE 54th Vehicular Technology Conference. VTC Fall 2001. Proceedings (Cat. No. 01CH37211), Oct. 7-11, 2001.

D.A. Wiegandt, C.R. Nassar; "Peak-to-Average Power Reduction in High-Performance, High-Throughput OFDM via Pseudo-Orthogonal Carrier-Interferometry Coding"; PACRIM. 2001 IEEE Pacific Rim Conference on, vol. 2, Feb. 2001.

X. Lin, et al.; "5G New Radio: Unveiling the Essentials of the Next Generation Wireless Access Technology"; IEEE Communications Standards Magazine ( vol. 3 , Issue: 3 , Sep. 2019 ) pp. 30-37. Dec. 6, 2019.

"D2.2 Architecture, system and interface definitions of a 5G for Remote Area network"; Project website: http://5g-range.eu; Version 1 date Apr. 26, 2018.

R. Rani, et al.; "Peak-to-Average Power Ratio Analysis of SCFDMA Signal by Hybrid Technique"; International Journal of Computer Applications (0975-8887) vol. 69—No. 15, May 2013.

H. Kim, et al.; "Multiple Access for 5G New Radio: Categorization, Evaluation, and Challenges"; arXiv:1703.09042 [cs.IT], Mar. 27, 2017.

A. Anand, et al.; "Joint Scheduling of URLLC and eMBB Traffic in 5G Wireless Networks"; IEEE INFOCOM 2018—IEEE Conference on Computer Communications; Apr. 16-19, 2018.

M. Bennis, et al.; "Ultra-Reliable and Low-Latency Wireless Communication: Tail, Risk and Scale"; Proceedings of the IEEE ( vol. 106 , Issue: 10 , Oct. 2018 ).

B.G. Agee; "Efficient Allocation of RF Transceiver Resources in Spatially Adaptable Communication Networks"; SDR Forum/MPRG Workshop on Advanced in Smart Antennas for Software Radios, At Virginia Polytechnic Institute, Blacksburg, VA.

C.A. Azurdia-Meza, et al.; "PAPR reduction in SC-FDMA by pulse shaping using parametric linear combination pulses"; IEEE Communications Letters, vol. 16, No. 12, Dec. 2012.

C.A. Azurdia-Meza, et al.; "PAPR Reduction in Single Carrier FDMA Uplink by Pulse Shaping Using a β-α Filter"; Wireless Pers Commun 71, 23-44 (2013). https://doi.org/10.1007/s11277-012-0794-0; Aug. 9, 2012.

(56) References Cited

OTHER PUBLICATIONS

A Hamed, et al.; "Bandwidth and Power efficiency analysis of fading communication link"; 2016 International Symposium on Performance Evaluation of Computer and Telecommunication Systems (SPECTS); Jul. 24-27, 2016.
Y. Akhtman, L Hanzo; "Power Versus Bandwidth Efficiency in Wireless Communications: from Economic Sustainability to Green Radio"; China Communications 7(2) Apr. 2010.
L. Militano, et al.; "Device-to-Device Communications for 5G Internet of Things"; EAI Endorsed Transactions on Internet of Things; Ghent vol. 1, Iss. 1, (Oct. 2015).
M. Vergara, et al.; "Multicarrier Chip Pulse Shape Design With Low PAPR"; 21st European Signal Processing Conference (EUSIPCO 2013); Sep. 9-13, 2013.
C. Liu, et al.; "Experimental demonstration of high spectral efficient 4 x 4 MIMO SCMA-OFDM/OQAM radio over multi-core fiber system"; Optics Express 18431, vol. 25, No. 15 | Jul. 24, 2017.
F. Wei, et al.; "Message-Passing Receiver Design for Joint Channel Estimation and Data Decoding in Uplink Grant-Free SCMA Systems"; IEEE Transactions on Communications, vol. 18 , Issue: 1 , Jan. 2019: Nov. 6, 2018.
H. Jiang, et al.; "Distributed Layered Grant-Free Non-Orthogonal Multiple Access for Massive MTC"; 2018 IEEE 29th Annual International Symposium on Personal, Indoor and Mobile Radio Communications (PIMRC); Sep. 9-12, 2018.
S. Sengar, P.B. Bhattacharya; "Performance Improvement in OFDM System by PAPR Reduction Using Pulse Shaping Technique"; International Journal of Emerging Technology and Advanced Engineering, vol. 2, Issue 12, Dec. 2012.
B.H. Alhassoun; "Peak-To-Average-Power-Ratio (PAPR) Reduction Techniques For Orthogonal-Frequency-Division-Multiplexing (OFDM) Transmission"; Thesis, University of Denver, Jun. 1, 2012.
A. Boonkajay, et al.; "Performance Evaluation of Low-PAPR Transmit Filter for Single-Carrier Transmission"; 2012 18th Asia-Pacific Conference on Communications (APCC); Oct. 15-17, 2012.
D. Das; "Peak to Average Power Ratio Reduction in OFDM Using Pulse Shaping Technique"; Computer Engineering and Applications vol. 5, No. 2, ISSN: 2252-5459 (Online) Jun. 2016.
D. Wulich, et al.; "Peak to Average Power Ratio in Digital Communications"; https://www.academia.edu/6222108/Peak_to_Average_Power_Ratio_in_Digital_Communications 2005.
S. Singh, et al.; "Analysis of Roll-Off-Factor to Reduce the PAPR in SC-FDMA System"; International Journal of Computational Intelligence Techniques, ISSN: 0976-0466 & E-ISSN: 0976-0474, vol. 3, Issue 2, 2012, pp. 76-78.
M. Mahlouji, T. Mahmoodi; "Analysis of Uplink Scheduling for Haptic Communications"; arXiv:1809.09837 [cs.NI], Sep. 26, 2018.
K. Au, et al.; "Uplink Contention Based SCMA for 5G Radio Access"; 2014 IEEE Globecom Workshops (GC Wkshps), Dec. 8-12, 2014.
S. Shah, A.R. Patel; "LTE-Single Carrier Frequency Division Multiple Access"; Jan. 1, 2010.
S.L. Ariyavisitakul, et al.; "Frequency Domain Equalization for Single-Carrier Broadband Wireless Systems"; IEEE Communications Magazine ( vol. 40 , Issue: 4 , Apr. 2002 ); pp. 58-66, Aug. 7, 2002.

\* cited by examiner

NON-ORTHOGONAL MULTIPLE ACCESS

CROSS REFERENCE TO PRIOR APPLICATIONS

This application claims the priority benefit of U.S. Patent Application Ser. No. 62/853,051, filed on May 26, 2019, which is expressly incorporated by reference herein in its entirety.

BACKGROUND

Aspects of this disclosure relate generally to communication systems, and more particularly, to transmission and reception in fifth generation (5G) and beyond cellular networks.

The background description includes information that may be useful in understanding the present inventive subject matter. It is not an admission that any of the information provided herein is prior art or relevant to the presently claimed inventive subject matter, or that any publication, specifically or implicitly referenced, is prior art.

Wireless communication systems provide various telecommunication services, such as telephony, video, data, messaging, and broadcasts. Wireless communication systems may employ multiple-access technologies capable of supporting communication with multiple users by sharing available system resources (e.g., time, frequency, power). Examples of multiple-access technologies include code division multiple access (CDMA), time division multiple access (TDMA), frequency division multiple access (FDMA), orthogonal frequency division multiple access (OFDMA), single-carrier frequency divisional multiplexing (SC-FDM), and discrete Fourier transform spread orthogonal division multiplexing (DFT-s-OFDM). It should be understood that SC-FDM and DFT-s-OFDM are two names of essentially similar technologies, known as Carrier Interferometry (CI). However, DFT-s-OFDM is the terminology used in 3GPP specifications.

These multiple access technologies have been adopted in various telecommunication and wireless network standards. For example, 5G (also called New Radio (NR)) wireless access is being developed with three broad use case families in mind: enhanced mobile broadband (eMBB), massive or enhanced machine-type communications (MTC), and ultra-reliable low-latency communications (URLLC). Beyond 5G refers to visions for future generations of wireless communications (e.g., SG-Advanced, SG-Extended, 6G) that enable groundbreaking high-bandwidth, low-latency, massive capacity, and massive connectivity. As demand for telecommunication and wireless access continues to increase, improvements in NR communications technology and beyond may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects.

5G's use cases for various services and emerging applications include enhanced Mobile Broadband (eMBB), which requires high data rate and mobility, massive Machine Type Communication (mMTC), supporting massive connection, and Ultra Reliable Low latency Communication (URLLC). 5G candidate waveforms include orthogonal frequency division multiplexing (OFDM), SC-FDM, Zero-tail SC-FDM, SC-FDM+WOLA, filter bank multi-carrier (FBMC), and generalized frequency division multiplexing (GFDM). Multicarrier spread spectrum transmission methods often employ a linear transform to spread energy of transmitted symbols over the subcarriers.

Disclosed aspects can be configured for non-orthogonal multiple access (NOMA) techniques, including power-domain techniques, such as super-position coding NOMA (SPC-NOMA), code-domain techniques, such as sparse code multiple access (SCMA) or pattern domain multiple access (PDMA), inter-leaver techniques, such as interleave division multiple access (IDMA), resource spread multiple access (RSMA), or multi-user shared access (MUSA).

PDMA relies on mapping the users' data that are to be transmitted into a group of resource elements (REs) according to a defined pattern. An RE might have a power, code, time, and/or spectral dimension. The transmission order is defined as the number of mapped resources. NOMA is provided when multiple users are multiplexed on the same resource.

Various modulation types and combinations may be performed. Phase-shift key (PSK), quadrature PSK (QPSK), pulse-amplitude modulation (PAM), frequency-shift key (FSK), quadrature amplitude modulation (QAM), and off-set-QAM (OQAM) are some examples. Index modulation (IM) schemes may be used to map information bits by altering the on/off status of their transmission entities, such as REs, transmit antennas, subcarriers, radio frequency (RF) mirrors, transmit light emitting diodes (LEDs), relays, modulation types, time slots, precoder matrices, dispersion matrices, spreading codes, signal powers, loads, routing paths, and so on. IM can activate a subset of the transmission entities to carry data bits via both M-ary complex data symbols and active transmission-entity indices.

SCMA modulation maps input data bits to a multi-dimensional codeword chosen from a layer-specific SCMA codebook. SCMA codewords are sparse, wherein only a few of their entries are non-zero and the rest are zero. The SCMA codewords corresponding to an SCMA layer have a unique location of non-zero entries, referred to as a sparsity pattern. The sparse codewords are then mapped onto resources, such as REs. For example, in SCMA-OFDM, codewords are mapped to input frequency bins of an IFFT, where only the non-zero values activate the IFFT. The discrete-time OFDM signal has a frequency-domain (e.g., OFDM) sparsity pattern based on the non-zero activations of the IFFT. However, this typically results in the discrete-time OFDM signal having a high peak-to-average-power ratio (PAPR).

In one aspect, at least one direct-sequence spreading code modulates a plurality of waveforms (e.g., a block, or sequence of pulses) to produce a discrete-time transmission signal. Each waveform may have its physical parameters (e.g., period, number of periods, pulse width, pulse shape, roll-off factor, sample rate, and so on) configured to provide certain time/frequency signal attributes (e.g., 5G NR numerology, OFDM symbol length, number of physical resource blocks, number of subcarriers, number of slots per subframe, slot length, PAPR, subcarrier bandwidth, subcarrier spacing, subcarrier pulse-shaping, total bandwidth, duty cycle, roll-off, out-of-band (OOB) leakage, cyclic prefix and/or suffix length, and so on) for a multicarrier signal. The spreading code may be designed to provide the discrete-time transmission signal with a particular frequency-domain sparsity pattern, and may be configured to provide this signal with a low PAPR. The code might be adapted to change the frequency-domain sparsity pattern without substantially affecting the PAPR. Unlike SCMA codewords, the direct-sequence code may be dense (although the direct-sequence code may be constructed by combining sparse codes), but it can provide the discrete-time signal with characteristics of a frequency-sparse multicarrier signal. The direct-sequence code may be configured to have a low PAPR (e.g., relative to other codewords), which usually provides the discrete-time signal with low PAPR. Codebook design may comprise selecting a direct-sequence codeword set with low PAPR (e.g., relative to SCMA codes), and then constellation adjustments of users colliding in a resource may be jointly designed via adaptations to the direct-sequence codes to keep the PAPR low.

For example, following a spreader that spreads data symbols with direct-sequence codes, a pulse-shaping filter might shape the spread symbols (or the spread symbols or codes may be modulated onto the pulse waveforms) to produce a discrete-time signal. The pulse-shaping filter may be a Dirichlet pulse-shaping filter that configures waveform parameters (e.g., pulse width, waveform duration, pulse shape) to produce an OFDM signal having a specified numerology and possibly other features. An OFDM sparsity pattern can be selected or adapted by selecting or adapting the direct-sequence spreading codes instead of selecting or adapting SCMA codebooks or the input mapping to the IFFT. In aspects disclosed herein, at least one direct-sequence code may be adjusted to effect a change in at least one of the discrete-time signal's frequency-domain properties. Such adjustments can exploit DFT or DTFT properties, such as linearity, time shifting (e.g., circular time shift or circular shift), frequency shifting, circular convolution, multiplication, differencing in time, time scaling, accumulation, decimation, interpolation, circular correlation, Parseval's relation, and so on.

SCMA modulation is a bits-to-symbols mapping that maps a set of data bits to multiple symbols in a sparse codeword, and thus provides for low-density spreading of the data when the symbols are modulated onto PEs. In some examples, dense direct-sequence codes are configured to effectively produce low-density spreading in the frequency domain. Direct-sequence spreading (or encoding) multiplies each data symbol by a direct-sequence code to produce a block or sequence of spread (or coded) data symbols such that information about each data symbol resides in multiple spread data symbols. Encoding can include or be referred to as spreading. The direct-sequence code (or a mathematical operation based on the code) may be used to reconstruct the original data at the receiving end. This is despreading or decoding. Decoding can include or be referred to as despreading. In some aspects, despreading comprises a correlation of the received spread data symbols with the direct-sequence code that the receiver already knows the transmitter is using. Spreading may comprise one or more linear transform operations (e.g., invertible transforms), and despreading can comprise the inverse operation(s). If spreading employs an orthogonal spreading matrix, despreading can employ the transpose of the spreading matrix. If the spreading matrix is unitary, despreading can employ the Hermitian adjoint (conjugate transpose) of the spreading matrix. Disclosed aspects may employ rectangular matrices (i.e., spreading matrices that are not square), such as matrices with orthonormal rows/columns, and the corresponding mathematics may be suitably adapted. For a spreading matrix that is not invertible, despreading may employ a generalized inverse of the spreading matrix. The Penrose conditions define different generalized matrix inverses. Depending on these conditions, despreading may employ the reflexive generalized inverse or the pseudoinverse of the spreading matrix. Despreading may employ other kinds of generalized inverses, such as one-sided inverse (left inverse or right inverse), Bott-Duffin inverse, or Drazin inverse.

Sparsity pattern describes the locations of non-zero values in a set of values in which the number of non-zero values is generally less than the number of zero values. A sparsity pattern can be the pattern of non-zero values in a sparse matrix (e.g., a sparse vector). A sparse matrix is typically defined as a matrix in which half or more of its values are zero. A frequency-domain sparsity pattern describes a sparse pattern of non-zero values in the spectrum of a discrete-time signal. For example, an OFDM sparsity pattern describes a pattern of non-zero discrete frequency values (such as OFDM subcarriers) in the spectrum of the discrete-time OFDM signal. A sparse vector may represent the OFDM sparsity pattern.

In general, a codebook may define layers that provide symbols to be transmitted via orthogonal resources. OFDM subcarriers are just one example of orthogonal resources that could be used. Orthogonal resources can be created by various means, such as in the frequency domain, the time domain, the code domain, the spatial domain, or others. For purposes of illustration, the examples that follow may simply refer to transmission via OFDM subcarriers. It should be appreciated that the teachings herein may be applicable to transmission via other resources as well. Non-orthogonal or quasi-orthogonal resources might be used in some applications.

In some aspects, a codebook uniquely maps each set of input bits to at least one direct-sequence codeword. Although the direct-sequence codeword might be dense, it can be configured to have an OFDM sparsity pattern characterized by a certain plurality of active subcarriers and a certain plurality of non-active subcarriers. Thus, for each input bit pattern, each discrete-time transmission is silenced on particular subcarriers, thereby providing the sparsity that is desired at the receiver side. Each codeword corresponding to a layer may have the same sparsity pattern.

In one aspect, an apparatus comprises a receiver, a transform, and a decoder. The receiver can be a radio receiver configured to receive a transmission from at least one transmitting device, wherein the transmission comprises an original codeword generated in a first basis by the transmitting device. The transform, also known as a linear transformation, a linear mapping, or a linear map, is configured to transform the original codeword from the first basis to a second basis to produce a transformed codeword, the second basis being different from the first basis. The transformed codeword is more sparsely distributed than the original codeword, which may be due to how the original codeword is designed, how the transform is selected, or both. The decoder performs joint detection of multiplexed layers in the received transmissions, such as by employing relationships between different transformed codewords.

Some examples of the method, apparatus, and non-transitory computer-readable medium described herein may be used in eMBB, MTC, URLLC, mmWave, D2D, ProSe, mobile edge computing, vehicular networks, or IOT communications. D2D and ProSe includes use cases wherein a UE supports ProSe Discovery and/or ProSe Communication (e.g., a ProSe-enabled UE). 3GPP Services working group defined use cases and scenarios for ProSe in TR 22.803, which is incorporated by reference in its entirety. Configuration signaling described herein can include ProSe discovery and/or communications signaling.

All patent applications and patents mentioned in this disclosure are hereby incorporated by reference in their entireties, including: U.S. Pat. Nos. 8,670,390, 9,225,471, 9,270,421, 9,325,805, 9,473,226, 8,929,550, 7,430,257, 6,331,837, 7,076,168, 7,965,761, 8,098,751, 7,787,514, 9,673,920, 9,628,231, 9,485,063, U.S. patent application Ser. No. 10/145,854, U.S. patent application Ser. No. 14/789,949, Pat. Appl. No. 62/197,336, U.S. patent application Ser. No. 14/967,633, Pat. Appl. No. 60/286,850, U.S. patent application Ser. No. 14/709,936, U.S. patent application Ser. No. 14/733,013, U.S. patent application Ser. No. 14/789,949, U.S. patent application Ser. No. 13/116,984, U.S. patent application Ser. No. 15/218,609, U.S. patent application Ser. No. 15/347,415, U.S. patent application Ser. No. 15/988,898, U.S. patent application Ser. No. 16/021,001, U.S. patent application Ser. No. 16/307,039, U.S. patent application Ser. No. 16/751,946, Pat. Appl. No. 62/510,987, Pat. Appl. No. 62/527,603, Pat. Appl. No. 62/686,083, Pat. Appl. No. 62/778,894, Pat. Appl. No. 62/662,140, Pat. Appl. No. 62/536,955, and PCT/US16/43852.

All publications disclosed herein are incorporated by reference in their entireties, including: LTE: Evolved Universal Terrestrial Radio Access (E-UTRA); Physical channels and modulation (3GPP TS 36.211 version 8.7.0 Release 8), 06/2009; LTE: Evolved Universal Terrestrial Radio Access (E-UTRA); Multiplexing and channel coding (3GPP TS 36.212 version 8.8.0 Release 8), 01/2010; 3GPP TR 21.914 version 0.8.0 Release 14: Technical Specification Group Services and Systems Aspects; and 3GPP TR 21.915 version 15.0.0 Release 15.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

Each depicted element in the drawings can be a part or step of a method or apparatus. Each element may be a means for performing its corresponding step, such as an electronic circuit, a computer processor programmed to perform the step, at least a portion of a non-transitory computer-readable memory comprising software instructions stored therein and executable by a processor to perform the step, or a software program or source code segment executable by a processor to perform the step. A means for performing a step may comprise a Cloud, a Fog, virtualized machines, and/or software-defined networks.

DETAILED DESCRIPTION

Figure 1:
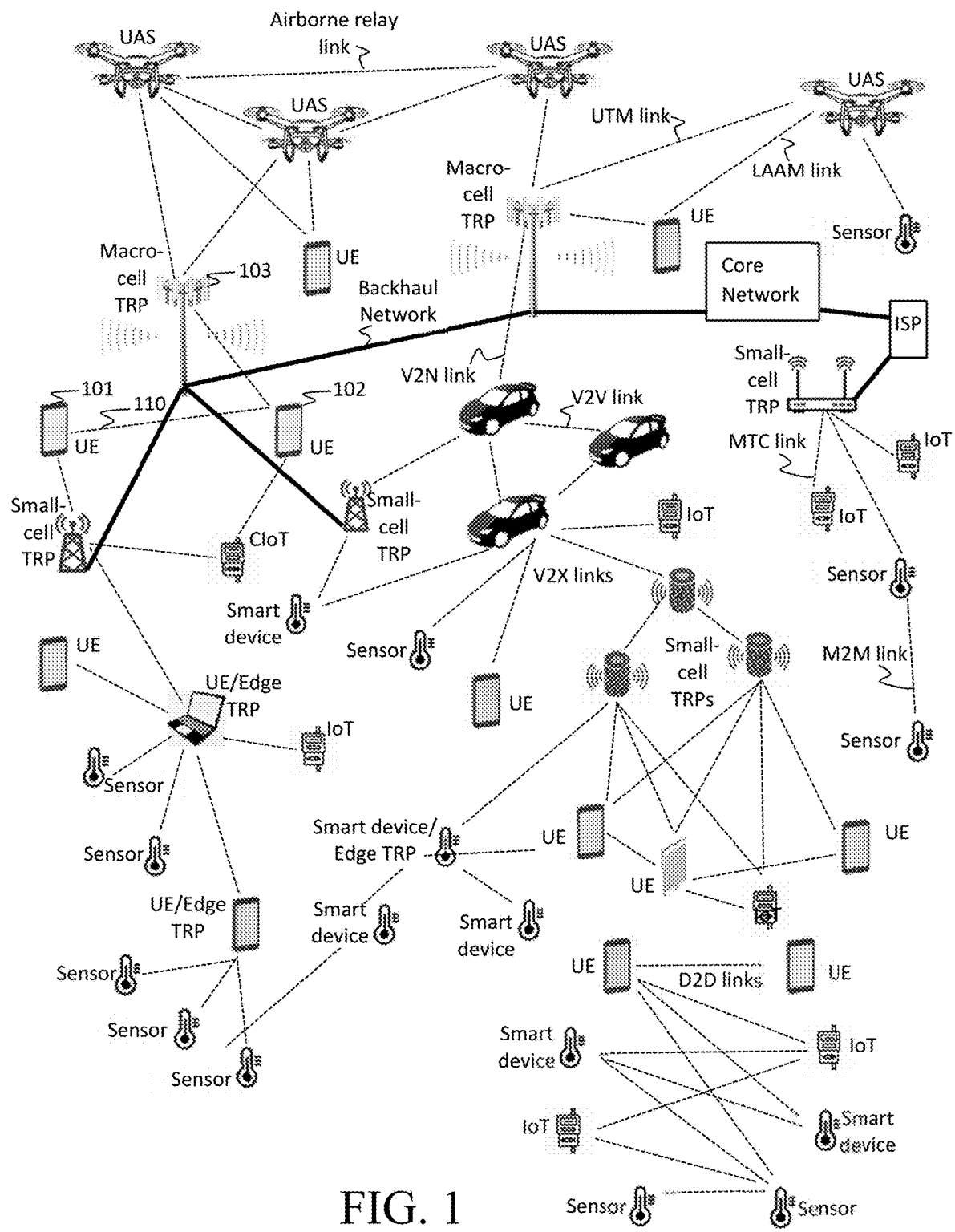
FIG. 1 illustrates an example of a wireless communication system in which disclosed aspects can be configured to operate.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 illustrates an example of a wireless communication system in which a user equipment (UE) can communicate with other devices via wireless communication signals. For example, a first UE 101 and a second UE 102 may communicate with a transmit receive point (TRP) 103 using wireless communication resources managed by the TRP 103 and/or other network components (e.g., a core network, an internet service provider (ISP), peer devices and so on). In some implementations, UEs may communicate with each other directly via a device-to-device (D2D) link 110 or some other similar type of direct link.

The components and links of the wireless communication system may take different forms in different implementations. For example, and without limitation, UEs may be cellular devices, Internet of Things (IoT) devices, cellular IoT (CIoT) devices, machine-type communication (MTC) devices, unmanned aerial systems (UASs), navigation systems, vehicles, robotic devices, smart alarms, remote sensors, smart phones, mobile phones, smart meters, personal digital assistants (PDAs), personal computers, wearables, mesh nodes, and tablet computers.

In some aspects, a TRP may refer to a physical entity that incorporates radio head functionality for a particular physical cell. In some aspects, the TRP may include 5G NR functionality with an air interface based on OFDM. NR may support, for example and without limitation, eMBB, mission-critical services, and wide-scale deployment of IoT devices. The functionality of a TRP may be similar in one or more aspects to (or incorporated into) the functionality of a CIoT base station (C-BS), a NodeB, an evolved NodeB (eNodeB), radio access network (RAN) access node, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other suitable entity. In different scenarios, a TRP may be referred to as a gNodeB (gNB), an eNB, a base station, an access point (AP), a data aggregation point (DAP), or some other terminology.

Various types of network-to-device links and D2D links may be supported in the wireless communication system. For example, D2D links may include, without limitation, machine-to-machine (M2M) links, MTC links, vehicle-to-vehicle (V2V) links, and vehicle-to-anything (V2X) links. Network-to-device links may include, without limitation, uplinks (or reverse links), downlinks (or forward links), vehicle-to-network (V2N) links, and V2X links. Broadcast links may include, without limitation, V2V links, V2X links, M2M links, and MTC links. In some aspects, V2V and V2N communication may be considered as examples of V2X communication.

In one example, a first wireless communication device transmits digital information over a communication channel (e.g., a wireless channel) to a second wireless communication device. In some implementations, each of the first wireless communication device and the second wireless communication device may correspond to the UE 101, the UE 102, or the TRP 103 of FIG. 1. An encoder at the first wireless communication device (a transmitting device, in this example) encodes information from an information source and sends the encoded data over the communication channel. A decoder at the second wireless communication device (a receiving device, in this example) decodes the received encoded data to recover the digital information. The encoder may comprise a direct-sequence encoder, or spreader. The decoder may comprise a direct-sequence decoder, or despreader. Alternatively, other types of decoders may be employed.

Figure 2A:
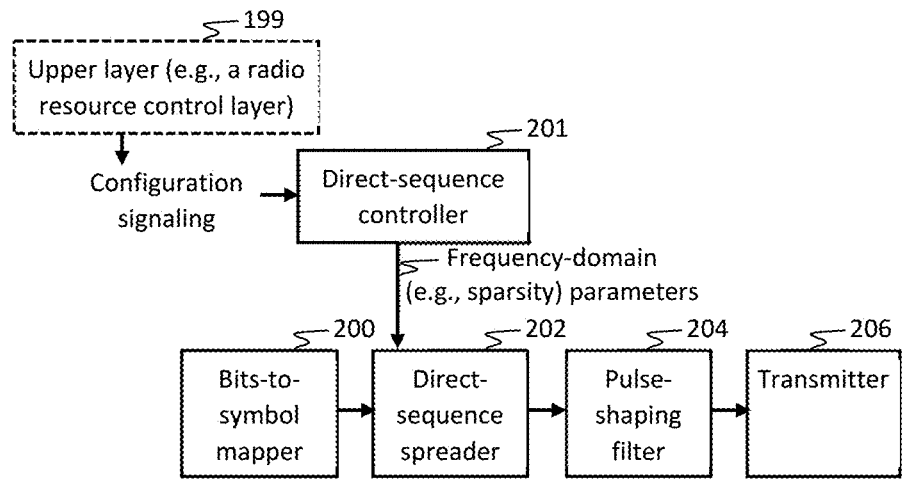
FIG. 2A-2M are diagrams that illustrate apparatus and method aspects in a transmitter. These aspects may be implemented by a computer processor or stored as software instructions in a non-transitory computer-readable memory.

FIG. 2A is a block diagram of a transmitting device, such as a UE or TRP, comprising a bits-to-symbols mapper 200, a direct-sequence spreader (e.g., encoder) 202, a pulse-shaping filter 204, and a transmitter 206. A direct-sequence controller 201 may provide for code synthesis and/or selection in the encoder 202 based on one or more configuration signaling parameters, at least some of which may be received from an upper layer, e.g., a radio resource control (RRC) layer 199 or application layer.

In some aspects, a method of communication comprises selecting at least one direct-sequence spreading code (e.g., in the encoder 202) corresponding to a layer or data symbol, followed by modulating (e.g., in the encoder 202 or filter 204) a block (or sequence) of pulse waveforms with the at least one direct-sequence spreading code to produce a discrete-time signal (e.g., which can be transmitted by the transmitter 206). The controller 201 operating with the encoder 202 can configure the at least one direct-sequence code to provide the discrete-time signal with a frequency-domain sparsity pattern designed for non-orthogonal multiple access. This can enable the transmitting device to conform with a conventional SCMA technical specification. Furthermore, the transmitting device and method can improve SCMA by generating discrete-time signals with a low PAPR. Here, low PAPR can mean that when a disclosed feature is used, the PAPR is lower than if the feature is not used. Numerous additional or alternative advantages can be realized in this and other disclosed aspects.

Figure 2B:
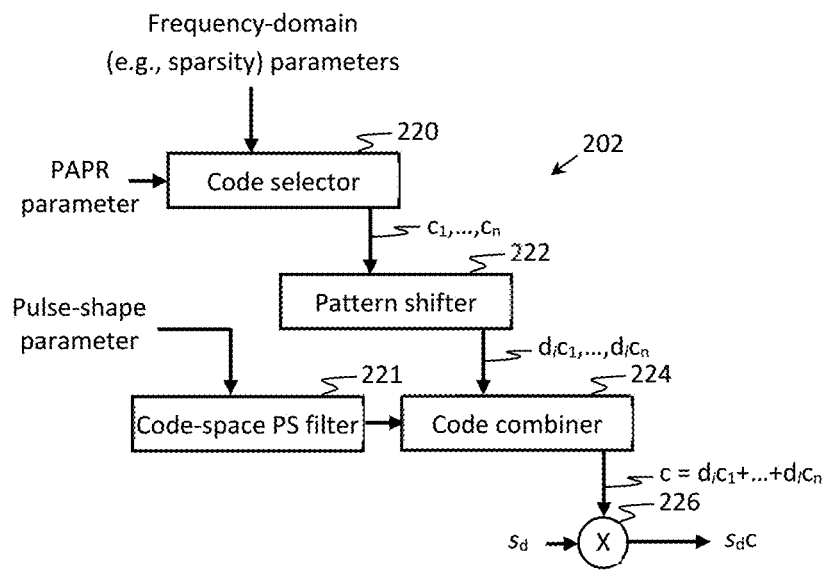

FIG. 2B is a flow diagram of an example implementation of the encoder 202. A code selector 220 can receive configuration signaling parameters, such as SCMA codebooks, frequency-domain parameters (e.g., sparsity patterns), and/or other signaling parameters. One or more direct-sequence code vectors $c_1, \ldots, c_n$ can be processed in a frequency-domain pattern shifter 222. In the case of multiple codes being selected 220, the codes can be summed (combined) in a code combiner 224 to produce a direct-sequence code vector c, which may spread 226 a data signal $s_d$. For example, two or more sparse direct-sequence codes may be summed to produce a dense direct-sequence code c. A code-space pulse-shaping filter 221 may shape (filter) the code vector c with respect to one or more predetermined or received pulse-shape parameters (e.g., roll-off factor, pulse type, etc.). The filter 221 can be configured to reduce OOB leakage of the transmission. Thus, pulse-shape parameter(s) might be selected from configuration signaling based on whether adjacent resource blocks to the transmission signal are used, such as may be determined from scheduling or predicted from the amount of network traffic. Code selection 220 may be based on a PAPR parameter, which may be received from configuration signaling, or based on a power-saving requirement for the device.

Figure 2C:
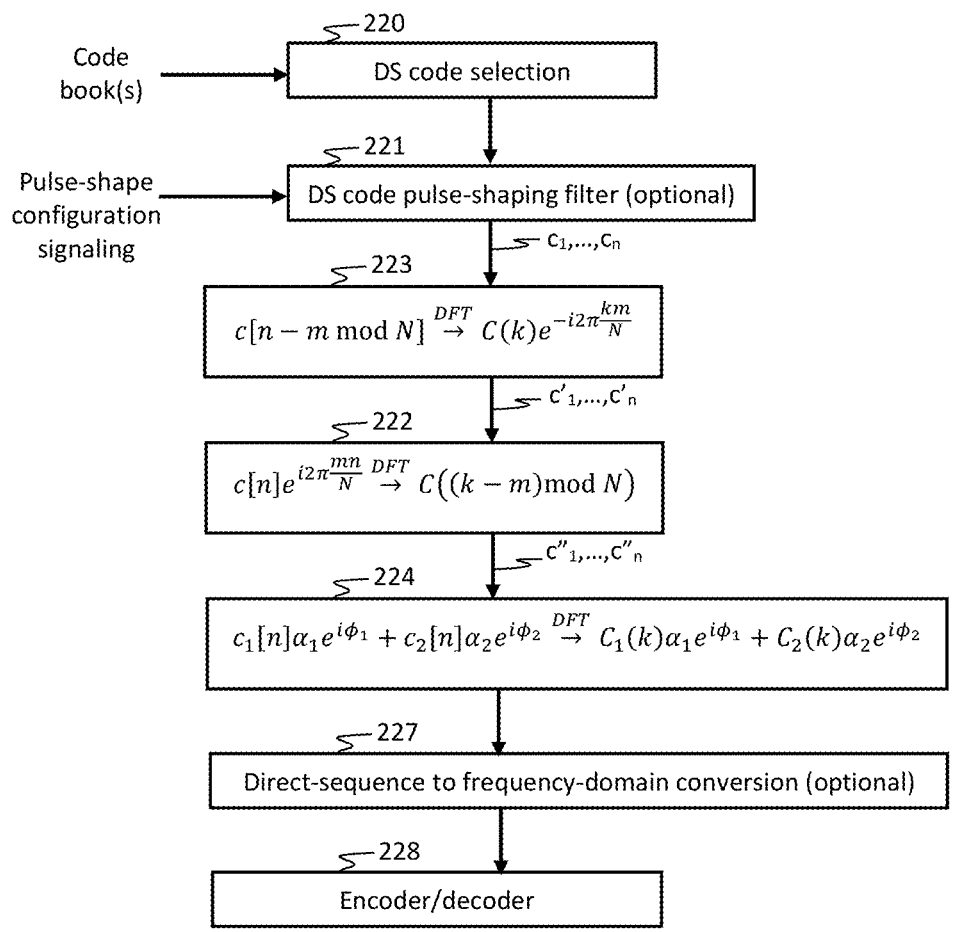

FIG. 2C is a flow diagram in accordance with disclosed transmitter and receiver aspects. One or more direct-sequence codes are selected 220, such as based on code book, layer, and/or data-symbol inputs. Selection 220 can provide the direct-sequence codes with at least one particular frequency-domain sparsity pattern. Optionally, the code(s) may be shaped with a code-space pulse-shaping filter 221. The filter 221 may operate on the combined signal after step 224. One or more codes may be cyclically shifted 223. One or more codes may be phase-shifted 222 to produce a cyclic shift of the frequency-domain pattern(s). The codes may be scaled and/or combined 224. In some aspects, direct-sequence codes may be converted 227 to frequency-domain codes, such as via a fast Fourier transform (FFT). The steps 220-224 provide for direct-sequence code generation. The code(s) may be used in an encoder or decoder 228.

Figure 3A:
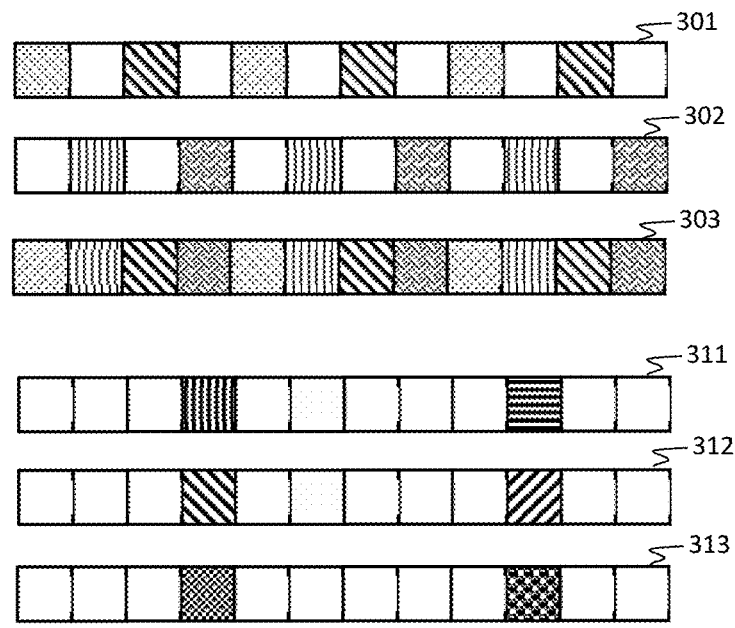
FIG. 3A-3P are signal plots that depict time-domain and frequency-domain signals that can be transmitted and received according to aspects disclosed herein.

FIG. 3A illustrates a set of direct-sequence codes 301-303 and their corresponding spectrums 311-313. A first and second direct-sequence codes 301 and 302 are length-12 codes with zero values depicted as unshaded boxes and non-zero values depicted as shaded boxes. Codes 311 and 312 each have similar sparsity patterns 311 and 312, respectively, where zero frequency values are depicted as unshaded boxes and non-zero frequency values are depicted as shaded boxes. With the appropriate pulse-shaping filter 204, the spectrums 311-313 can represent OFDM subcarrier frequencies, and thus, SCMA signals. Direct-sequence code 303 is the sum of codes 301 and 302, and its spectrum 313 (which is the sum of spectrums 311 and 312) has the same sparsity pattern as the spectrums 311 and 312. Thus, the code 303 is a dense sequence, but its corresponding OFDM signal is sparse. If the non-zero values in codes 301 and 302 are selected to have similar amplitudes, then the code 303 enables the discrete-time transmission signal to have low PAPR.

Figure 3B:
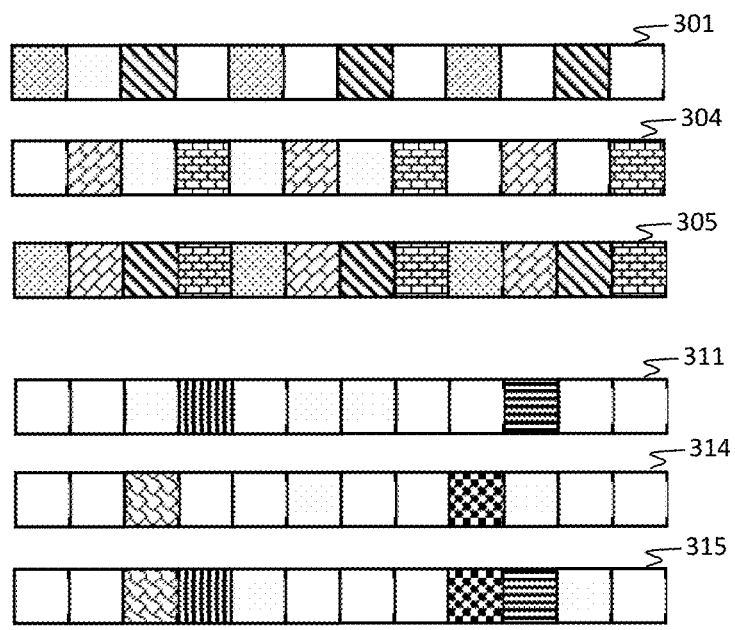

In FIG. 3B, direct-sequence codes 301 and 304 are combined to produce code 305. However, code 304 has a cyclically shifted spectrum 314 compared to code 301's spectrum 311. Code 305's spectrum 315 equals the sum of spectrums 311 and 314, as a result of the linearity property of the transform. Thus, FIGS. 3A and 3B depict how direct-sequence codes can be selected (and combined) to produce a desired frequency-domain sparsity pattern.

In one aspect, each direct-sequence code is selected 220 (or generated) to have a particular NOMA OFDM sparsity pattern of a set of NOMA OFDM sparsity patterns. For example, code 301's OFDM sparsity pattern 311 might be cyclically shifted 222 left one tone so it appears as pattern 314. There are 12/2 (code length divided by the number of non-zero values) orthogonal circular (e.g., cyclic) shift positions. Similarly, direct-sequence code 302 can have 6 orthogonal OFDM sparsity pattern shifts. All the OFDM-pattern-shifted codes 301 and 302 are orthogonal to each other, since Fourier mapping preserves orthogonality. Codes 301 and 302 might be part of a NOMA OFDM sparsity pattern set that includes at least one other direct-sequence code that is non-orthogonal to at least one of codes 301 and 302. For example, the at least one other code might have an OFDM sparsity pattern with at least one non-zero tone corresponding with a non-zero tone in the sparsity pattern of code 301 or 302.

In the following example, codes $c_1$ and $c_2$ are selected 220 such that when combined 224, they produce a discrete-time signal with a desired frequency-domain sparsity pattern and a low PAPR:

$$c_1(:,1)=[1\ 0\ -1\ 0\ 1\ 0\ -1\ 0\ 1\ 0\ -1\ 0];$$

$$c_2(:,1)=[0\ 1\ 0\ -1\ 0\ 1\ 0\ -1\ 0\ 1\ 0\ -1];$$

Figure 3C:
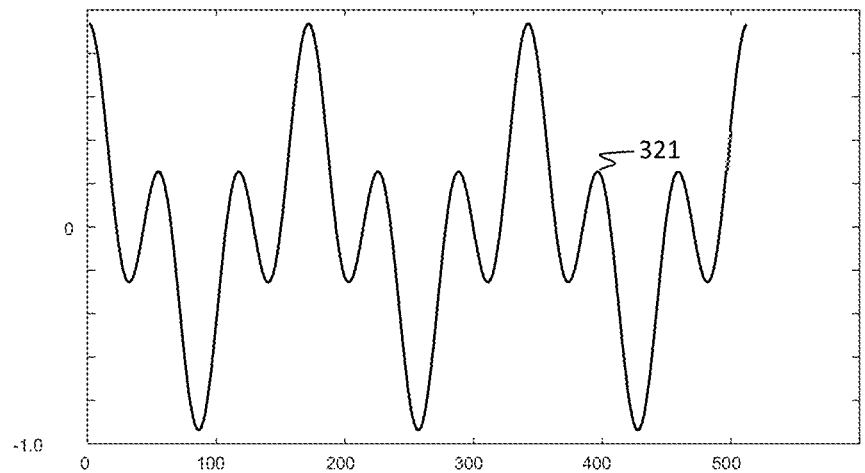
Figure 3D:
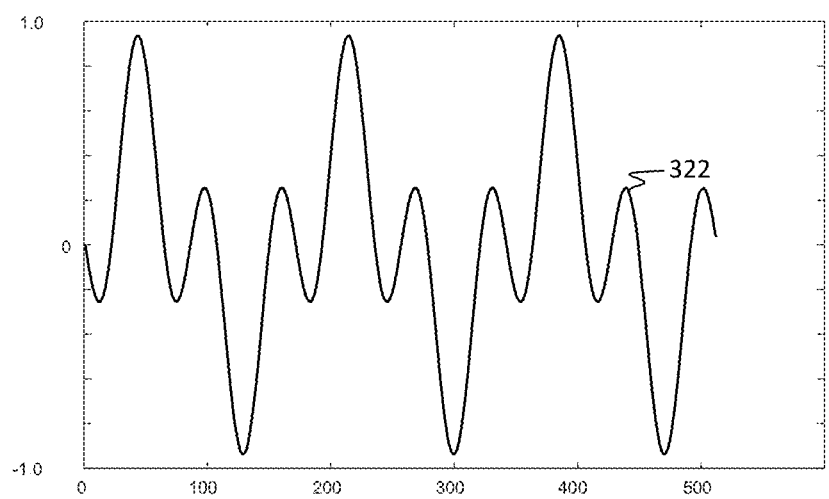

FIG. 3C depicts a discrete-time signal 321 produced by modulating a pulse sequence with code $c_1$, and FIG. 3D depicts a discrete-time signal 322 produced by modulating a pulse sequence with code $c_2$. For example, signal 321 is plotted as plot(1:512,(ifft(D*$c_1$,512))), where D is a 12×12 DFT matrix (or a 12-point FFT operator), and the combination of a 512-point IFFT and the 12-point DFT operation has the effect of providing a sequence of 12 cyclically shifted orthogonal pulses, each comprising a weighted sum of 12 OFDM subcarriers. Signal 322 represents similar operations using code $c_2$.

When $c_1$ and $c_2$ are summed, the resulting direct-sequence code $c_{12}$ is a dense code that has low PAPR:

$$c_{12}(:,1)=c_1(:,1)+c_2(:,1)=[1\ 1\ -1\ -1\ 1\ 1\ -1\ -1\ 1\ 1\ -1\ -1];$$

Figure 3E:
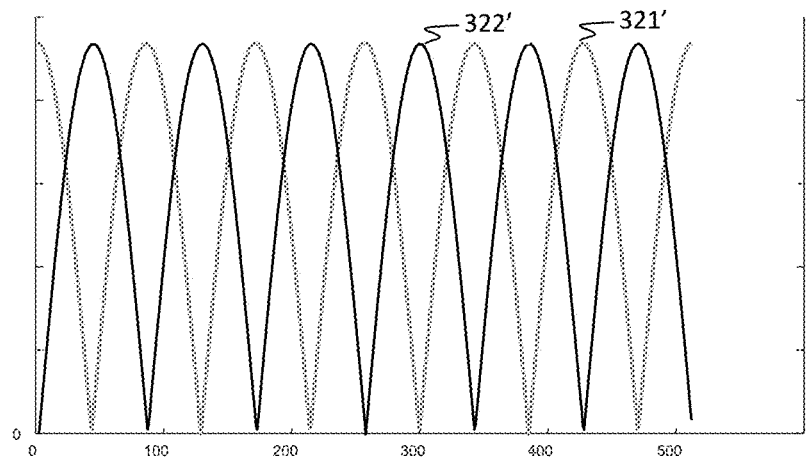
Figure 3F:
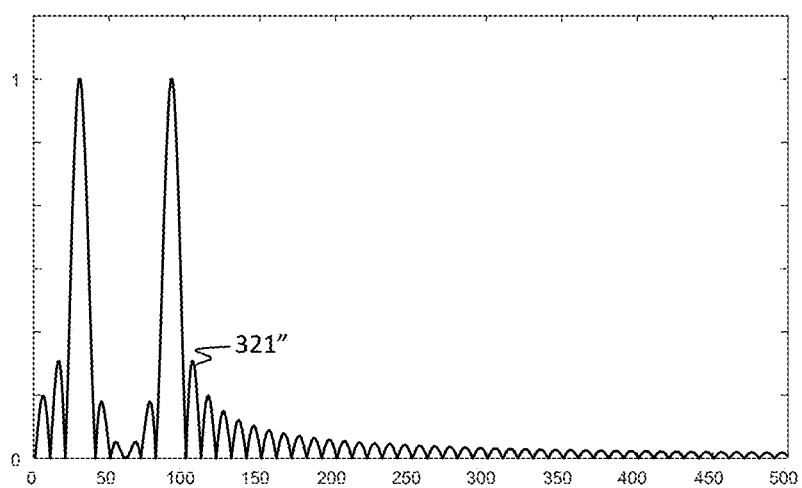

FIG. 3E depicts the absolute values 321' and 322' of signals 321 and 322, respectively. FIG. 3F depicts the spectrum 321" of the discrete-time signal 321. In this case, the spectrum corresponding to $c_1$ is computed as spectrum c1=fft(ifft(D*$c_1$,512),5120); and it is plotted for the first 500 data points.

Figure 2D:
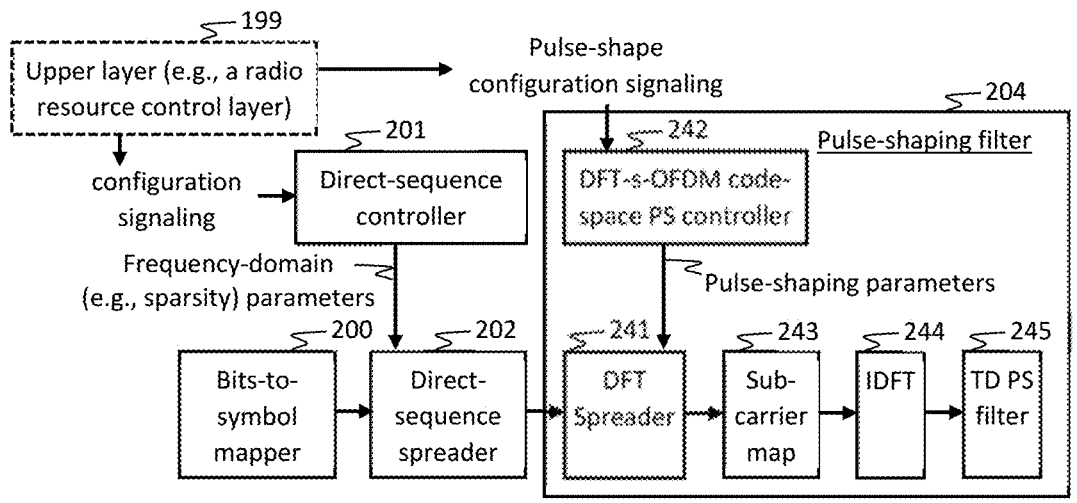

FIG. 2D is a block diagram of a Dirichlet-pulse transmitter apparatus and method wherein the pulse-shaping filter 204 can produce Dirichlet-based pulse waveforms that provide for OFDM signaling. The filter 204 receives pulse-shape configuration signaling, which may comprise configuration signaling, such as an indication of NR numerology, scheduling, or other information, which the filter 204 uses to shape the pulse waveforms. For example, the configuration signaling can indicate OFDM signal parameters, such as subcarrier spacing, OFDM symbol duration, cyclic prefix length, number of subcarriers, and so on.

The filter 204 comprises a DFT spreader 241, a subcarrier map 243, an IDFT 244, and optionally, a time-domain pulse-shaping filter 245. Optionally, a DFT-spread-OFDM code-space pulse-shape filter and controller 242 is provided. The controller 242 may be responsive to a pulse-shape message in a downlink control channel, modulation and coding information, resource scheduling, or other control information to select a DFT code space filter parameter (e.g., roll-off factor), or the controller may be responsive to internal state information, such as regarding battery power, data buffers, and so on. DFT 241 size, mapping 243, IDFT 244 size and zero padding, and filter 245 parameters are some of the possible features that can be adapted in accordance with the received configuration signaling.

With respect to the transmitter in FIG. 2D, an OFDM code space for signal 321 may be computed from the 12-point FFT:

$$fft(c_1,12)=[0\ 0\ 0\ 0.5\ 0\ 0\ 0\ 0\ 0\ 0.5\ 0\ 0];$$

The OFDM code space for signal 322 has the same sparsity pattern as the OFDM code space for signal 321, and is expressed by:

$$fft(c_2,12)=[0\ 0\ 0\ -0.5i0\ 0\ 0\ 0\ 0\ 0.5i0\ 0]$$

The sum of signals 321 and 322 also has the same sparsity pattern, and is expressed by:

$$fft(c_{12},12)=[0\ 0\ 0(0.5-0.5i)0\ 0\ 0\ 0\ 0(0.5+0.5i)0\ 0];$$

Accordingly, the linearity property of the DFT or DTFT can be exploited to combine two or more direct-sequence codes to produce a discrete-time signal with a desired OFDM sparsity pattern configured for NOMA, such as SCMA-OFDM. The linearity property can be expressed by:

$$c_1[n]\alpha_1 e^{i\phi_1}+c_2[n]\alpha_2 e^{i\phi_2} \xrightarrow{DFT} C_1(k)\alpha_1 e^{i\phi_1}+C_2(k)\alpha_2 e^{i\phi_2}$$

The complex weights $\alpha_j e^{i\phi_j}$ can be selected for code synthesis, including codebook optimization.

The Fourier map preserves the inner product, as shown by Parseval's theorem:

$$\sum_{n=0}^{N-1} x[n]g^*[n] = \frac{1}{N}\sum_{k=0}^{N-1} X[k]G^*[k]$$

Thus, a set of vectors that are orthogonal in one domain (i.e., their inner product is zero) are orthogonal when Fourier transformed to another domain. Similarly, the inner product for non-orthogonal vectors is preserved. This means that codebook design and optimization which are normally employed on SCMA codes can be adapted to be performed on direct-sequence codes instead. This may enable certain advantages, such as better control of PAPR.

Fourier-related transforms preserve the Euclidean distance between data values in the transformed domain. Thus, the constellation can be designed in the direct-sequence domain instead of the frequency code domain, which also enables the design to occur within constraints of a low-PAPR criterion. Similarly, rotations and other operators, and their evaluations, can be performed in the direct-sequence domain. In one example, first a multi-dimensional constellation is designed with a good Euclidean distance profile. The base constellation is then rotated to achieve a reasonable product distance. Having the rotated constellation, different sets of operators such as phase rotations are applied on top of it to build multiple sparse codebooks for several layers of SCMA. In some aspects, Karush-Kuhn-Tucker (KKT) conditions are introduced to realize codebook optimization.

A weighted sum of direct-sequence codes may provide a desired frequency-domain sparsity pattern, wherein the weights can be adapted to reduce the PAPR of the combined discrete-time signal without changing the sparsity pattern. In one aspect, a weighted sum of direct-sequence codes provides a desired frequency-domain sparsity pattern, wherein the weights can be adapted to change the non-zero frequency-domain values without changing the sparsity pattern. In another aspect, a sum of direct-sequence codes that produces a discrete-time signal with low PAPR can have one or more of the direct-sequence codes operated upon by a linear-phase vector (e.g., circular frequency shift 222) to change the frequency-domain sparsity pattern while preserving low PAPR.

In one example, code vector $c_2$ is element-wise multiplied 222 by a column of the 12-point DFT matrix, e.g., the second column, D(:,2), to shift its frequency-domain pattern:

$c_{2s1}=c_2\cdot{}^*D(:,2);=[0\{0.866-0.5i\}0\ I\ 0(-0.866-0.5i)$
$0\{0.866-0.5i\}0\ I\ 0\{-0.866-0.5i\}]$ and its OFDM code space is $fft(c_{2s1},12)=[0\ 0\ -0.5i0\ 0\ 0\ 0\ 0\ 0.5i0\ 0\ 0];$ Each column of D provides a different circular shift 222 of the direct-sequence code's frequency-domain (e.g., OFDM) sparsity pattern. For example, the second column of D causes a left circular shift by one unit, which is seen by comparing fft($c_2$,12) with fft($c_{2s1}$,12).

Figure 3G:
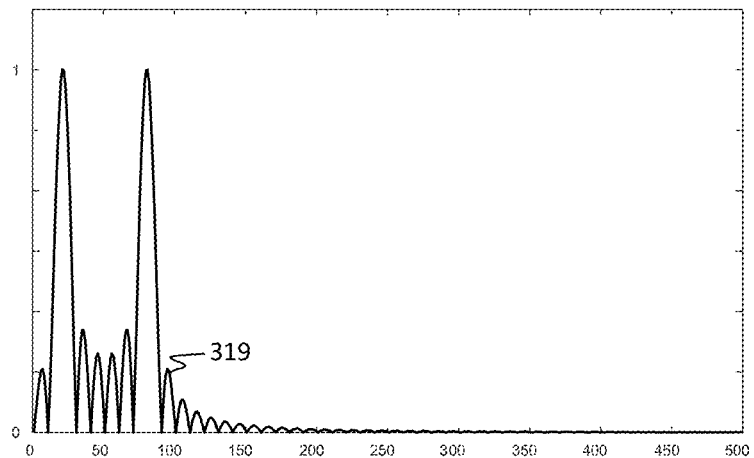
Figure 3H:
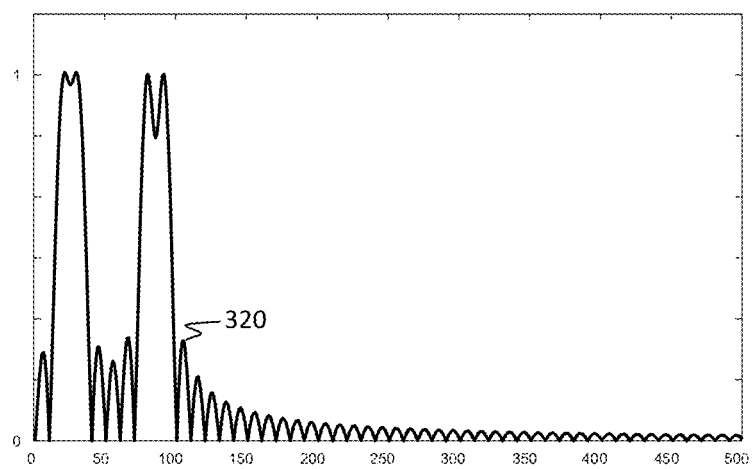

FIG. 3G shows the spectrum 319 corresponding to $c_{2s1}$, and FIG. 3H shows the spectrum corresponding to the sum, $c_1+c_{2s1}$. The OFDM code space of this discrete-time signal is:

$fft(c_1+c_{2s1},12)=[0\ 0\ -0.5i0.5\ 0\ 0\ 0\ 0\ 0.5i0.5\ 0\ 0];$ and the spectrum 320 for this discrete-time signal is shown in FIG. 3H, which is to the sum of spectrums 321" and 319. As taught herein, the frequency-shift property of a Fourier transform can be exploited to adapt a direct-sequence code such that its frequency-domain sparsity pattern is shifted. Generally, this can be implemented as:

$$e^{i\phi n}c[n] \stackrel{DTFT}{\rightarrow} C(e^{i(\omega-\phi)})$$

wherein $\omega$ is the frequency of the corresponding frequency-domain samples of C( ), and $\phi$ indicates a phase shift applied to a code sequence or coded sequence c[n], which results in a frequency offset of the C( ) samples. Similarly, OFDM index modulation may be at least partially effected by the mapping of the spread-DFT symbols to input (frequency) bins of the IFFT. Other transform properties may be exploited to effect code index modulation and OFDM index modulation. For example, circular convolution or circular correlation may be exploited in one domain to effect a corresponding multiplication in the other domain, and vice versa. In some aspects, this may be performed to effect multiplication of the frequency-domain samples by a sparse matrix.

The shift 222 may be implemented by multiplication of the sequence c[n] with the complex exponential sequence $$e^{i2\pi\frac{mn}{N}}$$

to produce a circular shift of the frequency-domain pattern by m units.

$$c[n]e^{i2\pi\frac{mn}{N}} \stackrel{DFT}{\longrightarrow} C((k-m)\bmod N)$$

A shift in position in one domain gives rise to a phase change in another domain. Circular shift 223 of the sequence c[n] corresponds to multiplying the frequency-domain values by a linear phase.

$$c[n-m\bmod N] \stackrel{DFT}{\longrightarrow} C(k)e^{-i2\pi\frac{km}{N}}$$

As illustrated above, a circular shift 223 of a sparse direct-sequence code can be performed such that a sum 224 of sparse direct-sequence codes produces a dense direct-sequence code, which may have low PAPR. In other aspects, circular shifts of a code or one or more of the code's sparse components can be performed for codebook optimization.

In some aspects, a set of direct-sequence basis codes is provisioned to generate a NOMA OFDM signal. A selection 220 of direct-sequence basis codes may comprise orthogonal (or non-orthogonal) basis vectors, such as vectors $c_1$, $c_2$, and $c_3$:

$w_1\cdot c_1(:,1)=w_1\cdot[1\ 0\ 0\ 1\ 0\ 0\ 1\ 0\ 0\ 1\ 0\ 0];$ $w_2\cdot c_2(:,1)=w_2\cdot[0\ 1\ 0\ 0\ 1\ 0\ 0\ 1\ 0\ 0\ 1\ 0];$ $w_3\cdot c_3(:,1)=w_3\cdot[0\ 0\ 1\ 0\ 0\ 1\ 0\ 0\ 1\ 0\ 0\ 1];$ where $w_1$, $w_2$, and $w_3$ are complex weights. A composite or aggregate direct-sequence code c comprises a linear combination 224 of direct-sequence basis codes (e.g., by summing complex-weighted basis codes). Parseval's theorem and the linearity of the Fourier map means a set of complex-weighted orthogonal basis vectors in one domain maps to a set of complex-weighted orthogonal basis vectors in the other domain:

$fft(w_1 \cdot c_1(:,1),12) = w_1 \cdot [4\ 0\ 0\ 0\ 4\ 0\ 0\ 0\ 4\ 0\ 0\ 0]$;

$fft(w_2 \cdot c_2(:,1),12) = w_2 \cdot [4\ 0\ 0\ 0\ -2-3.464i0\ 0\ 0\ -2+3.464i0\ 0\ 0]$;

$fft(w_3 \cdot w_3(:,1),12) = w_3 \cdot [4\ 0\ 0\ 0\ -2+3.464i0\ 0\ 0\ -2-3.464i0\ 0\ 0]$;

The OFDM sparsity pattern for each of the direct-sequence codes $c_1$, $c_2$, and $c_3$ is $[\alpha_1\ 0\ 0\ 0\ \alpha_2\ 0\ 0\ 0\ \alpha_3\ 0\ 0\ 0]$, where $\alpha_1$, $\alpha_2$, and $\alpha_3$ are non-zero complex values corresponding to the first, fourth, and eighth tones, respectively. In NOMA, the direct-sequence codes $c_1$, $c_2$, and $c_3$ may be selected 220 to have an OFDM sparsity pattern that overlaps (e.g., collides) with at least one other different sparsity pattern. An example of one of these other different sparsity patterns is the OFDM sparsity pattern associated with $c_{2s1}$ described above, which is $[0\ 0\ \beta_1\ 0\ 0\ 0\ 0\ 0\ \beta_2\ 0\ 0\ 0]$, where $\beta_1$ and $\beta_2$ are non-zero complex values corresponding to the third and eighth tones, respectively. Since there is an overlap (i.e., collision of non-zero values) at one or more tones (e.g., $\alpha_3$ and $\beta_2$ at the eighth tone), these are NOMA OFDM sparsity patterns.

Figure 2E:
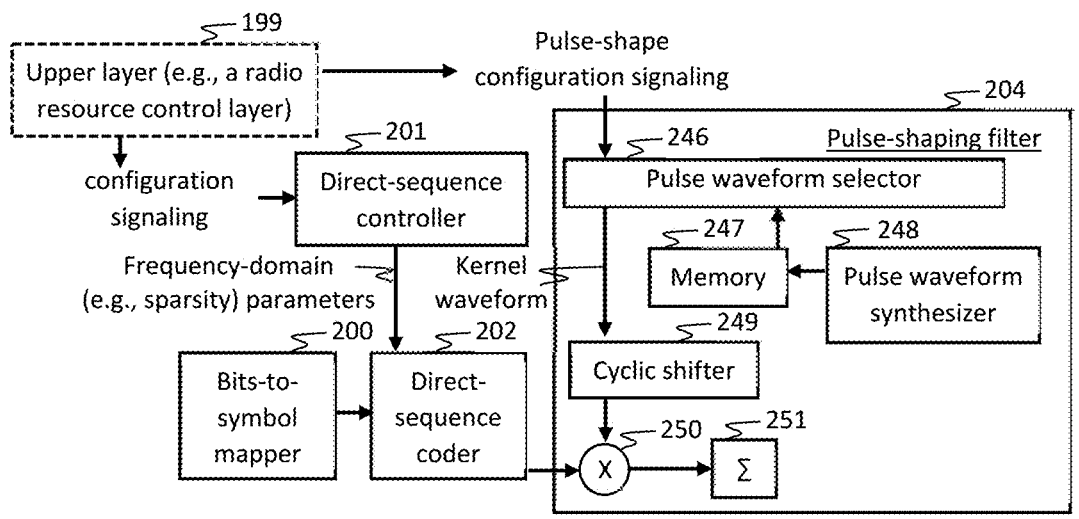

FIG. 2E is a block diagram of a transmitter apparatus and method wherein the pulse-shaping filter 204 comprises a pulse waveform selector 246 that is responsive to configuration signaling to retrieve one or more pulse waveforms from memory 247. A pulse-waveform synthesizer 248 may store kernel or prototype waveforms and/or pulse sequences in the memory 247. A cyclic shifter 249 may be used to perform sequence (e.g., time) and/or frequency shifts on a kernel waveform. A modulator 250 multiplies each kernel with a code symbol from the coder 202, and the modulated kernels are combined (e.g., summed) 251 to produce a discrete-time signal.

Figure 2F:
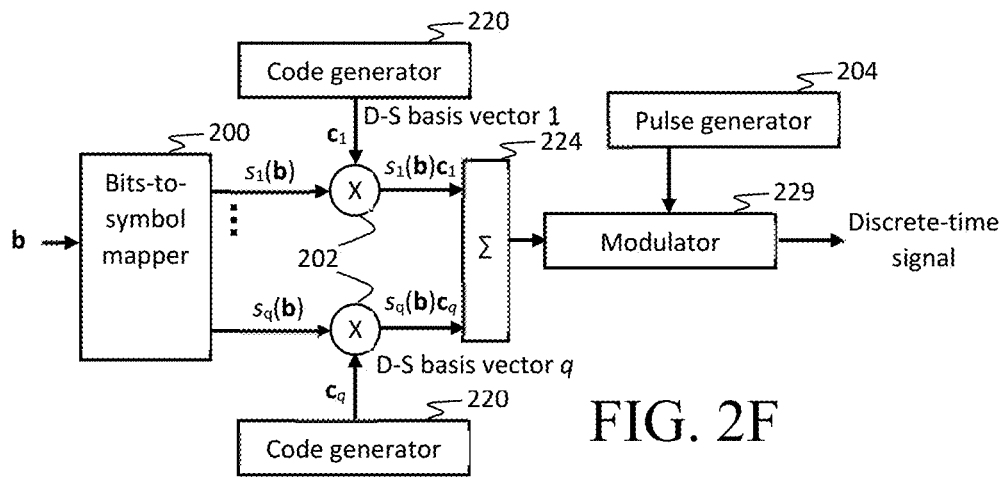

In FIG. 2F, a transmitter comprises bits-to-symbols mapper 200 (e.g., an SCMA coder, a QAM modulator, etc.), which maps a set of input bits b to one or more (e.g., q) data symbols $s_1(b), \ldots, s_q(b)$. The data bits may first be encoded using a forward error correcting (FEC) code. As an example, a turbo encoder, a low-density parity-check encoder, or a polar encoder may be used to encode the data bits. The mapper 200 then produces a plurality of constellation points from the encoded bits. The constellation may be one dimensional or multidimensional. At least one code selector 220 may produce one or more orthogonal (e.g., orthonormal) basis vectors (e.g., direct-sequence spreading codes) $c_1, \ldots, c_q$ to spread 202 each data symbol $s_1(b), \ldots, s_q(b)$. The spread symbols $s_1(b)c_1, \ldots, s_q(b)c_q$ may be combined 224 (e.g., weighted and summed) and modulated 229 onto a sequence (e.g., block) of cyclically shifted pulses produced by pulse generator 204 (e.g., a pulse-shaping filter). The code selector 220 may produce non-orthogonal basis vectors to provide for NOMA.

In some aspects, direct-sequence basis codes having similar OFDM sparsity patterns can be combined 224 to produce a different OFDM sparsity pattern, such as by cancelling out at least one element in the pattern. For example, the sum $(c_1-c_2)$ has the NOMA OFDM sparsity pattern, $[0\ 0\ 0\ 0\ \alpha_2\ 0\ 0\ 0\ \alpha_3\ 0\ 0\ 0]$. Different direct-sequence basis vectors might have the same or different OFDM sparsity patterns. The one or more of the selected basis codes may be filtered 221, may be shifted 223, and/or may be element-wise multiplied 222 with a linear-phase vector to shift its OFDM sparsity pattern. Combining 224 may produce NOMA signals.

Due to the similarity of the PAPR in the direct-sequence code space to the PAPR of the resulting discrete-time signal, the complex weights $w_1$, $w_2$, and/or $w_3$ can be selected to control or adjust the discrete-time signal's PAPR while corresponding adjustments to the SCMA constellation in the frequency-domain are confined to a particular NOMA-OFDM sparsity pattern. This can be useful for codebook design and optimization, signal synthesis in the transmitter, and/or signal analysis in the receiver.

Figure 2G:
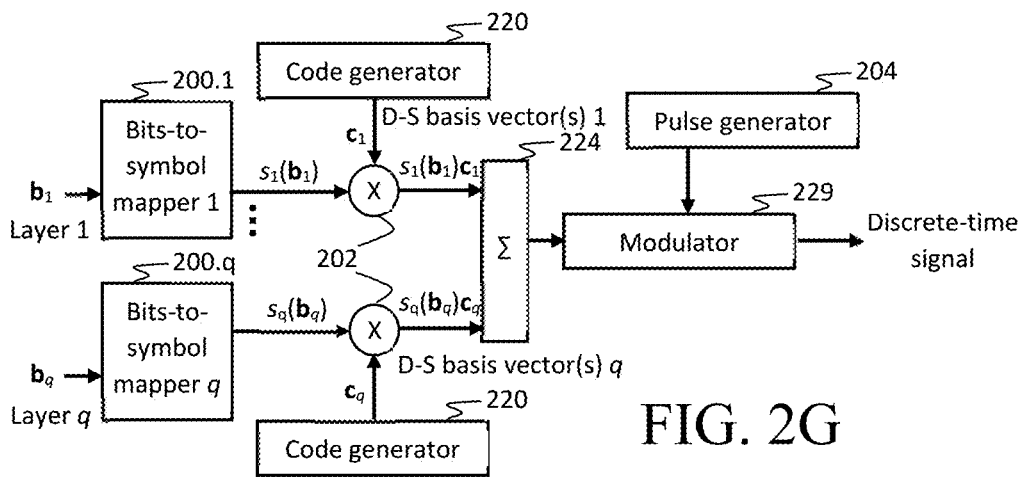

In other aspects, assigning (e.g., scheduling) multiple layers to a device (a UE or TRP) can be provisioned to provide the aggregate transmission of those layers with a low PAPR. In FIG. 2G, each of layers 1 to q to be multiplexed has a corresponding bit streams $b_1$ to $b_q$. Bits-to-symbols mappers 200.1-200.q map their respective blocks of data bits to symbols $s_1(b_1)$ to $s_q(b_q)$. In one example, multiple data symbols may each express the bits in block $b_1$. Each data symbol may be encoded 202 (e.g., spread) with at least one orthogonal basis vector, and the resulting sequences $s_1(b_1)c_1$ to $s_q(b_q)c_q$ are combined 224, followed by modulation 229 onto a cyclic sequence of pulses. In some aspects, the basis vectors are non-orthogonal.

For example, a first layer may employ the basis $(c_1-c_2)$, which is the direct-sequence code $[1\ -1\ 0\ 1\ -1\ 0\ 1\ -1\ 0\ 1\ -1\ 0]$ with corresponding OFDM sparsity pattern, $[0\ 0\ 0\ 0\ \alpha_2\ 0\ 0\ 0\ \alpha_3\ 0\ 0\ 0]$. A second layer may employ the direct-sequence basis code, $c_3 \cdot {}^*D(:,2)$, which is $[0\ 0\ e^{-i2\pi 2/12}\ 0\ 0\ e^{-i2\pi 5/12}\ 0\ 0\ e^{-i2\pi 8/12}\ 0\ 0\ e^{-i2\pi 11/12}]$, with corresponding OFDM sparsity pattern $[0\ 0\ 0\ \gamma_1\ 0\ 0\ 0\ \gamma_2\ 0\ 0\ 0\ \gamma_3]$. The first and second layers are orthogonal, as their OFDM sparsity patterns have no collisions. However, the first and second layers could employ non-orthogonal bases in other examples. The sum of the direct-sequence codes $(c_1-c_2)$ and $c_3 \cdot {}^*D(:,2)$ is a vector in which each element has an absolute value of one, which can provide a low-PAPR discrete-time signal. Each layer's codebook might comprise products of data symbols with its bases.

Figure 2H:
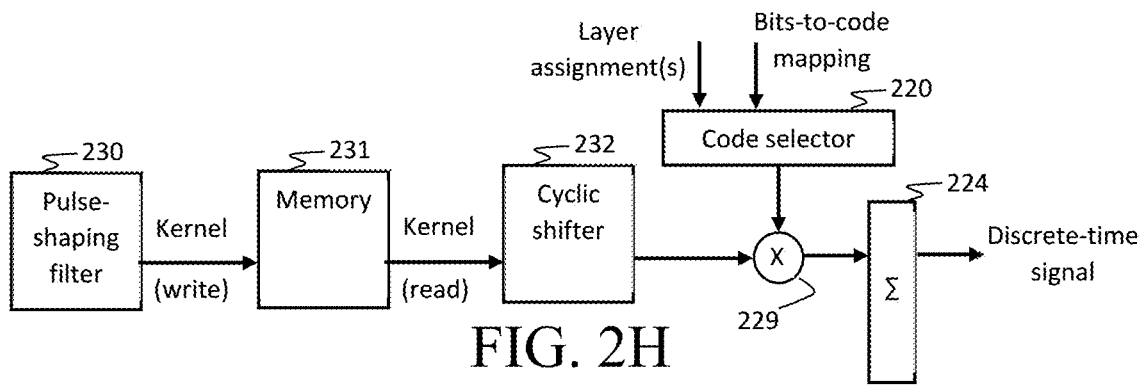

NOMA-OFDM signals can be generated via direct-sequence coding instead of requiring the IDFT typically used in OFDM modulation. Also, this approach can avoid the complex architectures and filters associated with the various types of GFDM, FBMC, and other transmission schemes mentioned herein. In FIG. 2H, a pulse-shaping filter 230 can provide at least one kernel waveform comprising a pulse that may be represented by a superposition of a plurality of frequency subcarriers, possibly with subcarrier-level filtering. The kernel may be stored in a memory 231 and read by a kernel selector 232, which may include a cyclic shifter that can generate cyclic shifted versions of the kernel. Alternatively, cyclic shifted versions of the kernel may be stored in the memory 231, and particular ones retrieved by the kernel selector 232. Pulse waveforms, such as GFDM, FBMC, Dirichlet, SC-FDM, Zero-tail SC-FDM, SC-FDM+WOLA, raised cosine, half-cosine, root raised cosine, Gaussian, Isotropic Orthogonal Transform Algorithm (IOTA), Extended Gaussian Function (EGF), and so on may be stored. Each waveform can be modulated 229 with a code symbol of a direct-sequence codeword selected from a codebook, wherein the codebook corresponds to a layer assignment, and the codeword corresponds to a pattern of input bits. The modulated waveforms are summed 224 to produce a discrete-time signal.

In one aspect, an apparatus comprises a transceiver and a processor. The processor may be configured to receive, via the transceiver, configuration signaling based on different communication scenarios. Based on the configuration signaling, the kernel selector 232 retrieves a kernel from the memory 231, wherein the kernel has at least one pulse parameter indicated by or derived from the configuration signaling. A sequence of pulses may be generated from the selected kernel (such as via the cyclic shifter 232 and combiner 224), and the sequence modulated 229 with a direct-sequence code selected 220 to filter one or more subcarrier frequencies in the pulses, such as to provide a particular frequency-domain sparsity pattern.

Each kernel may comprise a superposition of subcarriers, and may include subcarrier-level filtering according to different schemes. Thus, each kernel can comprise a subcarrier profile, which includes subcarrier number, spacing, bandwidth, and/or type of subcarrier-level filtering. Each kernel may have associated pulse parameters, such as pulse type, roll-off, and/or other pulse-shape filter parameters. Each kernel may include a cyclic prefix and/or suffix, and/or zero tail. Different pulse shapes, thus different kernels, may be employed for different communication scenarios, such as may be indicated by the configuration signaling received by the transceiver. The kernel selector 232 may be responsive to the configuration signaling for retrieving a kernel having a particular parameter set from the memory 231. Alternatively, the pulse-shaping filter 230 is responsive to the configuration signaling for generating and delivering the kernel to the cyclic shifter 232. The code selector 220 selects at least one direct-sequence code that effectively filters the spectral content of the pulse sequence. For example, the code selector 220 may receive a layer assignment or codebook (possibly from the configuration signaling) that specifies a particular frequency-domain sparsity pattern, and the code selector can select or generate at least one direct-sequence code to produce that pattern when it modulates the pulse sequence. The code selector 220 may perform a bits-to-code mapping to select a particular code(s) corresponding to a set of data bits, such as to perform code-index modulation.

Figure 3I:
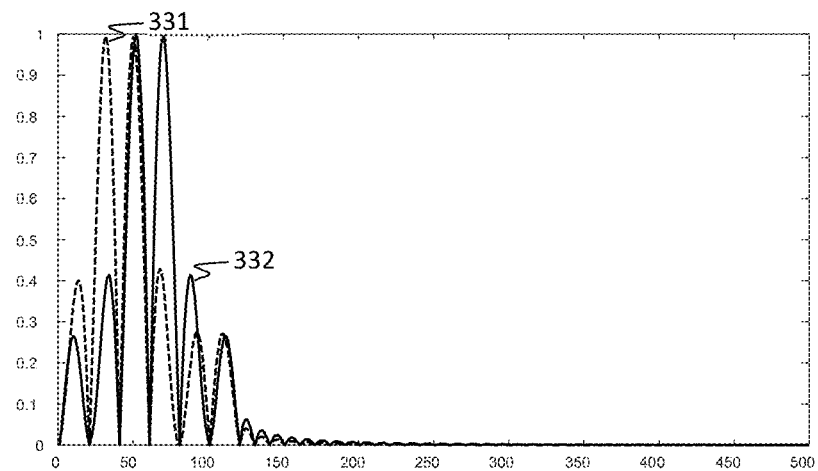
Figure 3J:
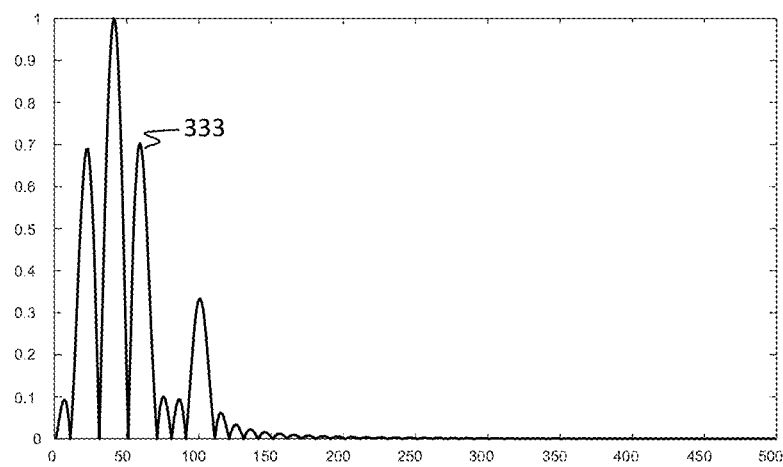

Disclosed aspects can provide for power-domain multiple access or pattern-domain multiple access (PDMA) signaling in which different signal amplitudes convey information. FIG. 3I illustrates spectrums 331 and 332 of direct-sequence codes that have multiple amplitude levels across different frequency components, such as OFDM tones. The direct-sequence codes can be configured to provide the discrete-time signal with low PAPR. Spectrum 333 shown in FIG. 3J is a linear combination of spectrums 331 and 332.

Figure 3K:
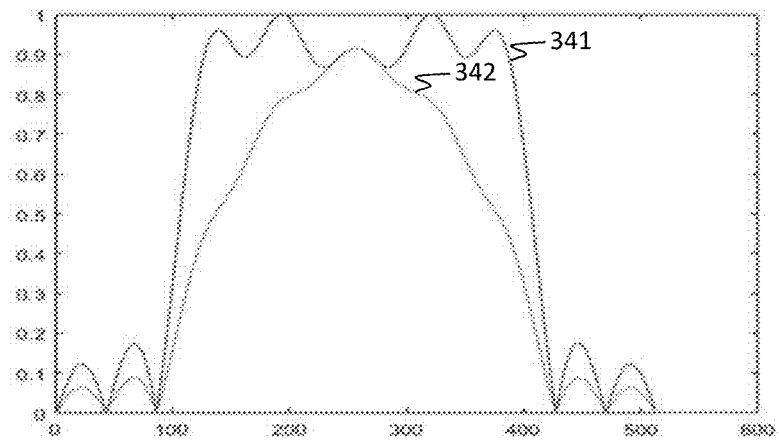
Figure 3L:
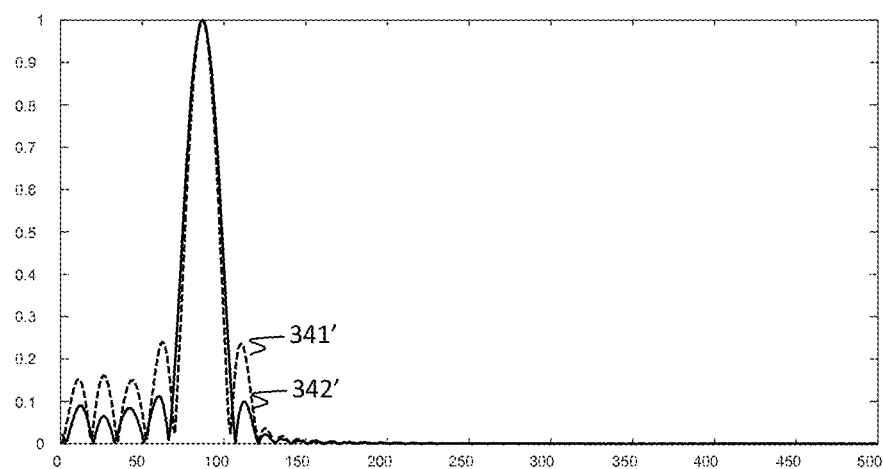
Figure 3M:
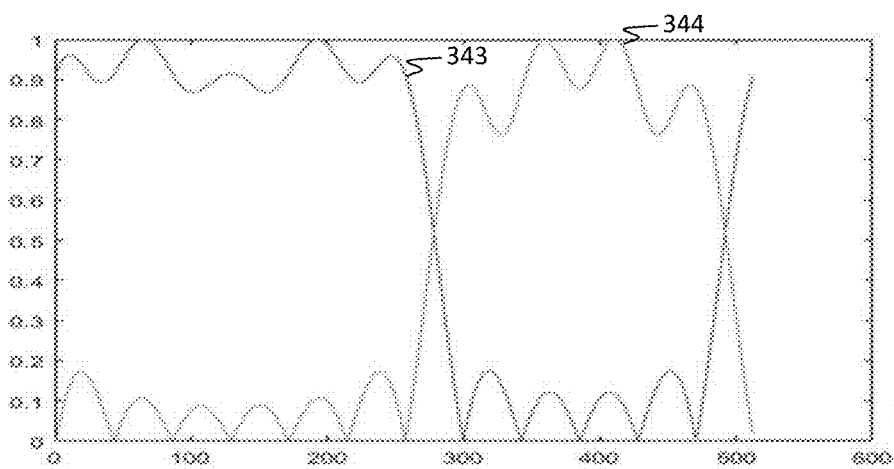

In FIG. 3K, a discrete-time signal 341 of a pulse sequence modulated with a direct-sequence code $c_1$ is compared to a discrete-time signal 342 for when the code is pulse-shaped 221, e.g., $f_1 . *c_1$. In one example, a pulse-shaping filter may provide an element-wise multiplication of $c_1$ with vector $f_1$, which may have a pulse-shape type (e.g., half-cosine, raised cosine, root raised cosine, Gaussian, etc.) and possibly at least one pulse-shape parameter (e.g., roll-off factor), the type and parameter(s) possibly being provided via configuration signaling from an upper layer 199. FIG. 3L shows spectrums 341' and 342' of the discrete-time signals corresponding to direct-sequence codes $c_1$ and $f_1 . *c_1$, respectively. This code-space filtering 221 can reduce the sidelobes in the spectrum, which can reduce out-of-band emissions. The filtering 221 can be configured to reduce the PAPR of the discrete-time signal. FIG. 3M shows a first contiguous set of mainlobes 343 and a second contiguous set of mainlobes 344 in an OFDM symbol. Separate direct-sequence codes may be applied to the pulse waveforms in signals 343 and 344, such as to select their corresponding OFDM sparsity patterns. Each set might correspond to a different layer.

Figure 2I:
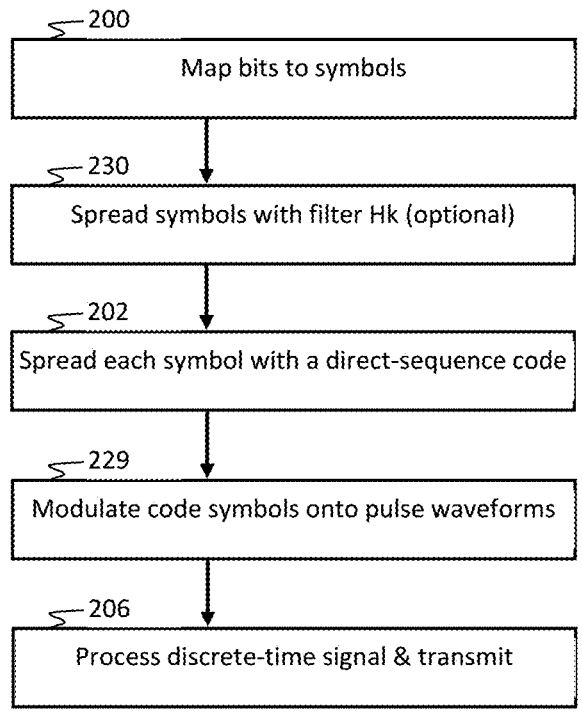

In FIG. 2I, a transmitter maps data bits to data symbols 200, optionally spreads 230 the data symbols via a filter, spreads 202 each data symbol (or filtered data symbol) with a direct-sequence code, modulates 229 the spread data symbols onto a block of pulse waveforms, and processes 206 the resulting discrete-time signal for transmission in a communication network.

A means for mapping can include the bits-to-data-symbols mapper (200), such as an M-ary modulator, a QAM mapper, an LDS spreader, or an SCMA spreader; and may include an FEC encoder. A means for spreading data symbols across multiple OFDM symbols may include the filter 230. A means for selecting at least one direct-sequence code corresponding to a layer or a data symbol can comprise the code selector 220 (which can generate direct-sequence codes and/or select previously generated codes stored in memory), and/or may comprise a direct-sequence controller 201 and/or spreader 202. The means for selecting may further comprise any of the elements 221-224. A means for modulating a block of pulse waveforms with the at least one direct-sequence code to produce a discrete-time signal may include the modulator 229 or 262.I and 262.Q. The means for modulating may include a pulse-shaping filter 204, which may be or include a pulse generator 204. In one example, the means for modulating can be a component (250) of the pulse-shaping filter 204 (such as shown in FIG. 2E). In another example, the means for modulating can comprise operations or components of the pulse-shaping filter 204 that operate on an input direct-sequence signal, such as elements 241, 243, 244, and 245 in FIG. 2D. A means for transmitting, such as the transmitter 206, can transmit the discrete-time signal. A means for configuring the at least one direct-sequence code to provide the discrete-time signal with a frequency-domain sparsity pattern configured for NOMA can comprise the direct-sequence controller 201. In some aspects, the means for configuring can comprise the spreader 202. For example, this can include the code selector 220 and may include the frequency shift 222, sequence shift 223, filter 221, and/or combiner 224.

In one aspect, modulation 229 may employ a pulse generator, such as the pulse-shaping filter 204 in FIG. 2D, which upsamples the spread data symbols by a factor equal to the ratio of IDFT and DFT block sizes, and applies a circular pulse shape with a Dirichlet function (i.e., periodic sinc) before adding a cyclic prefix. The Dirichlet function is:

$$D_{N_d}(x_d) = \begin{cases} \dfrac{\sin\left(\dfrac{N_d x_d}{2}\right)}{N_d \sin(x_d/2)} & x \neq 2\pi k, k = 0, \pm 1, \pm 2, \ldots \\ (-1)^{k(N_d-1)} & x = 2\pi k, k = 0, \pm 1, \pm 2, \ldots \end{cases}$$

for any nonzero integer $N_d$. This function has period $2\pi$ for odd $N_d$ and period $4\pi$ for even $N_d$. The magnitude of the function is $1/N_d$ times the magnitude of the DTFT of the $N_d$-point Rect window.

Figure 3N:
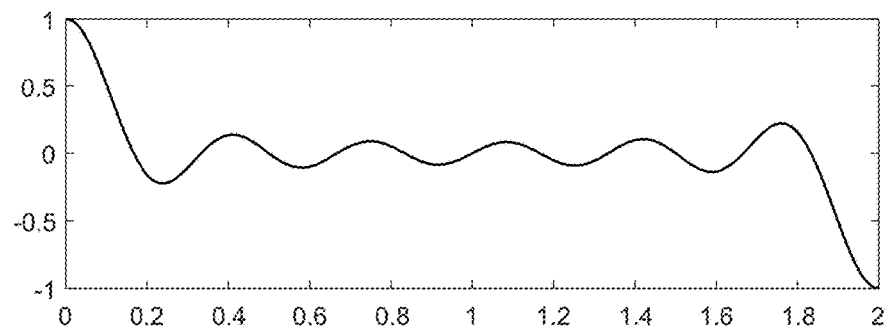
Figure 3O:
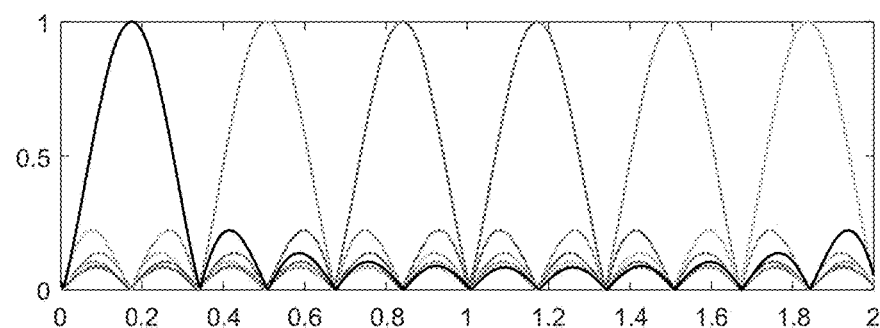

The data symbols can modulate 229 the (cyclic) shifted Dirichlet functions. This differs from single-carrier schemes because the shifts are circular, so the pulse shapes associated with the data symbols can lose their contiguity in time. For example, FIG. 3N is a plot of a Dirichlet function for $N_d=12$ over 0-$2\pi$. The main lobe associated with the first input of the DFT appears at the head and tail parts of an OFDM symbol, thus causing sharp transitions at the OFDM symbol boundaries. In some aspects, this can be remedied by shifting the pulse waveforms by half of a pulse width, as shown in FIG. 3O, which is a plot of the absolute values of the Dirichlet functions. This discussion can be adapted for the period $4\pi$, for odd $N_d$, or for other pulse shapes.

For simplicity of illustration, 12 periodic sinc functions can be orthogonally positioned in an OFDM symbol interval, wherein a first set of six are depicted in FIG. 3O, and a second set of six can be positioned so each peak of the second set corresponds to one of the zero crossings in the first set. A length-6 direct-sequence code might be modulated on each set, or a length-12 code might be modulated onto the 12 periodic sinc functions.

Figure 2J:
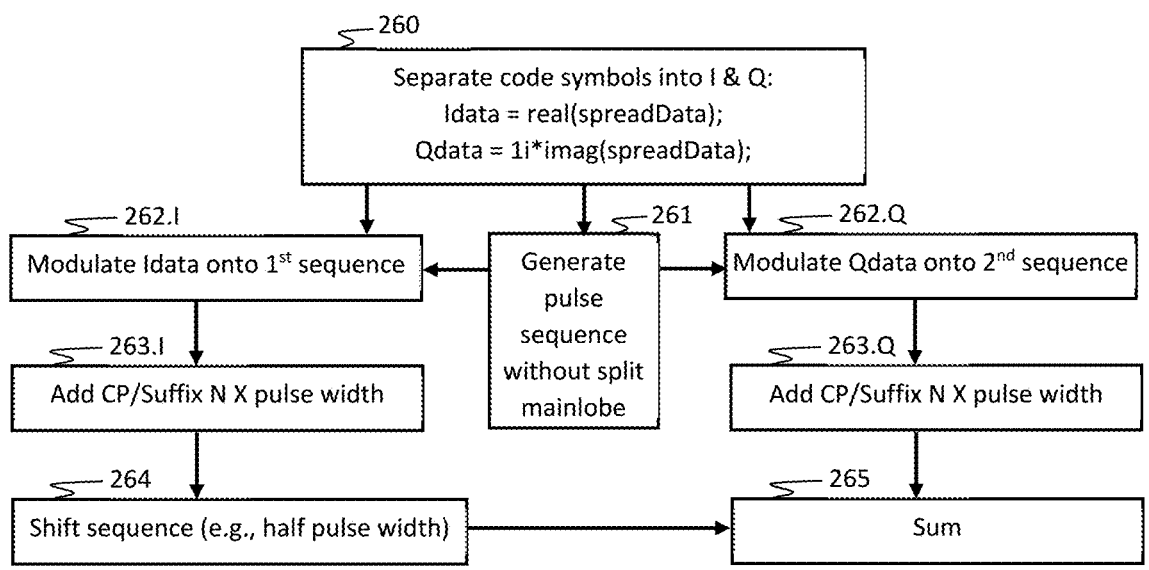
Figure 3P:
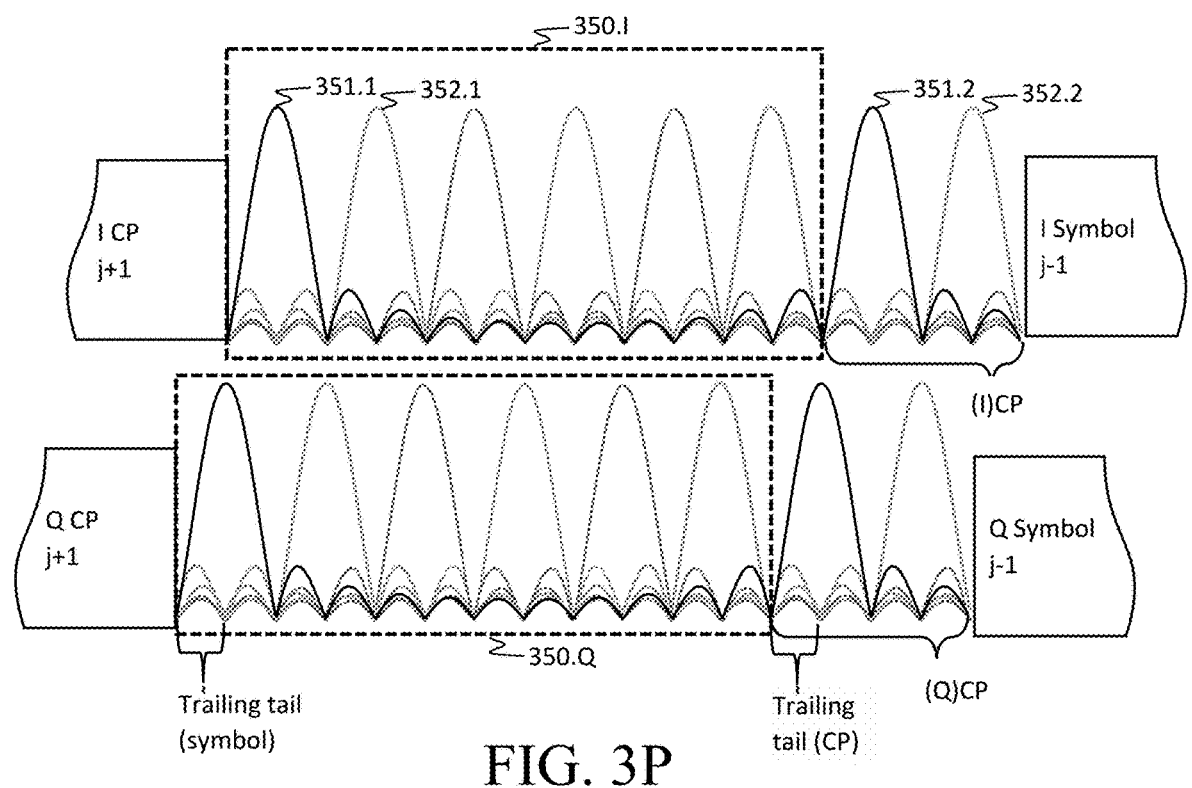

FIG. 2J depicts an example modulation 229 aspect that can reduce sharp transitions at the OFDM symbol boundaries. The code symbols can be separated 260 into I and Q components to produce Idata and Qdata vectors. First and second pulse sequences 350.I and 350.Q can be generated, each having a duration of an OFDM symbol, such as depicted in FIG. 3P. Idata may be modulated 262.I onto the first sequence 350.I and Qdata may be modulated 262.Q onto the second sequence 350.Q. A cyclic prefix and/or suffix can be inserted (263.I and 263.Q) to each sequence, each being an integer multiple of a pulse (e.g., mainlobe) width measured between the mainlobe's zero crossings. For example, in FIG. 3P, a cyclic prefix equal to two pulse widths is shown, where pulses 351.1 and 352.1 in the OFDM symbol interval are repeated (shown as 351.2 and 352.2) in the cyclic prefix (I)CP. A similar cyclic prefix (Q)CP is appended to sequence 350.Q. The cyclic prefix (I)CP avoids a sharp transition at the boundary of the previous OFDM symbol (I symbol j−1), which also does not have a pulse that is split between its head and tail parts. Similarly, the sequence 350.I can avoid a sharp transition at the trailing OFDM symbol boundary if the cyclic prefix of the following OFDM symbol (I CP j+1) is provisioned similar to (I)CP.

One of the sequences 350.I or 350.Q is shifted 264 by half of a pulse width, such as depicted in FIG. 3P, and the sequences 350.I and 350.Q are summed 265. In a receiver, the combined signal might be sampled over a duration depicted by the OFDM symbol duration 350.I plus its cyclic prefix (I)CP. The cyclic prefix (I)CP is normally discarded, leaving the symbol duration 350.I, which in this case also includes the trailing tail of (Q)CP, and OFDM symbol 350.Q minus a trailing tail of this symbol. Since the trailing tail of (Q)CP is the missing portion of the symbol 350.Q (Trailing tail (symbol)), the complete quadrature portion of the OFDM symbol is also within the sampling region of 350.I. Thus, a DFT can demodulate both the I and Q portions of the OFDM symbol.

Figure 2K:
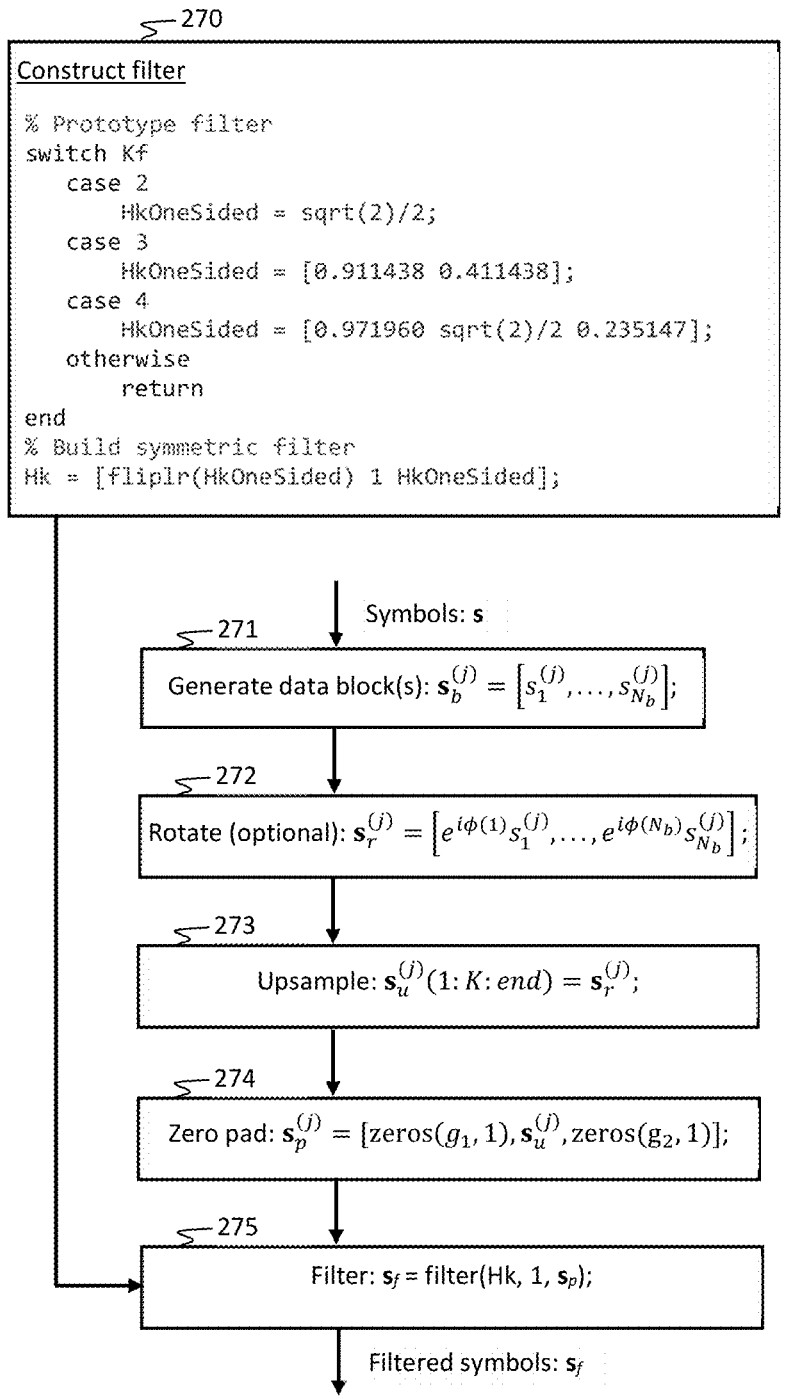

In an alternative aspect, a split pulse might be subtracted from a pulse sequence (e.g., block) or zeroed (such as by assigning a zero value in the corresponding function or transform). A cyclic prefix and/or suffix equal to an integer number of pulse widths can be added to overlap the zeroed pulse in order to form a cyclic-extended OFDM symbol. Adjacent OFDM symbols can be overlapped at the zeroed pulse to form a smooth transition between OFDM symbols. In some aspects, the data symbols can be spread 230 across multiple OFDM symbols, such as shown in FIG. 2K. This can improve spectral efficiency and relax synchronization requirements, among other benefits. A filter Hk according to one or more parameters is constructed 270. Input data symbols s are organized 271 into blocks of $N_b$ symbols. Optionally, the symbols may be rotated (e.g., phase shifted) 272. This may reduce PAPR in the discrete-time signal. The symbols are upsampled 273. The parameter Kf can be considered to be a stride length for the filter. Zero padding 274 may be performed, followed by filtering 275 with Hk.

The function filter(fb,fa,xd) filters 275 input data xd using a rational transfer function defined by numerator and denominator coefficients fb and fa.

Referring back to FIG. 2I, each filtered data symbol is spread with a direct-sequence code 202 and then modulated 229 in a different OFDM symbol interval. The direct-sequence code filters the pulse waveforms, allowing some frequency components to pass while blocking others. The spectrum of each allowed frequency component is shaped by the symmetric filter Hk. Each data symbol $sn^{(j)}$ is mapped into multiple filtered symbols $s_f$. Thus, by causing each data symbol to span multiple OFDM symbols, the filter Hk helps reduce OOB leakage. Parameters (e.g., duration, pulse width, pulse shape, roll-off factor, and so on) of the pulse waveforms can be selected to provide particular OFDM waveform parameters (e.g., 5G NR numerologies, PAPR, and so on), and may be selectable based on configuration signaling, such as from the upper layer 199.

In a UE, the configuration signaling might be received via a downlink channel, such as the physical downlink control channel (PDCCH), and can include resource grants, modulation and coding scheme (MCS) (e.g., MCS index), transport block size (TBS), number of layers, number of allocated physical resource blocks (PRBs), number of REs for DM-RS per PRB in the scheduled duration, overhead, pulse-shape parameters, number of scheduled OFDM symbols in a slot, and other data, possibly configured specifically for disclosed aspects. The physical uplink shared channel (PUSCH) and control parameters might be scheduled via an uplink (UL) grant in the downlink control information (DCI), in a Random Access Response, or via RRC signaling. The configuration signaling might include layer 3 and/or layer 2 signaling. Layer 3 includes the RRC layer, and layer 2 includes a packet data convergence protocol (PDCP) layer, a radio link control (RLC) layer, and a medium access control (MAC) layer. Configuration signaling might be provided via a physical downlink shared channel (PDSCH) or any broadcast channel.

In a TRP, the configuration signaling might be received via an uplink channel, such as the physical uplink control channel (PUCCH) or PUSCH. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 2L:
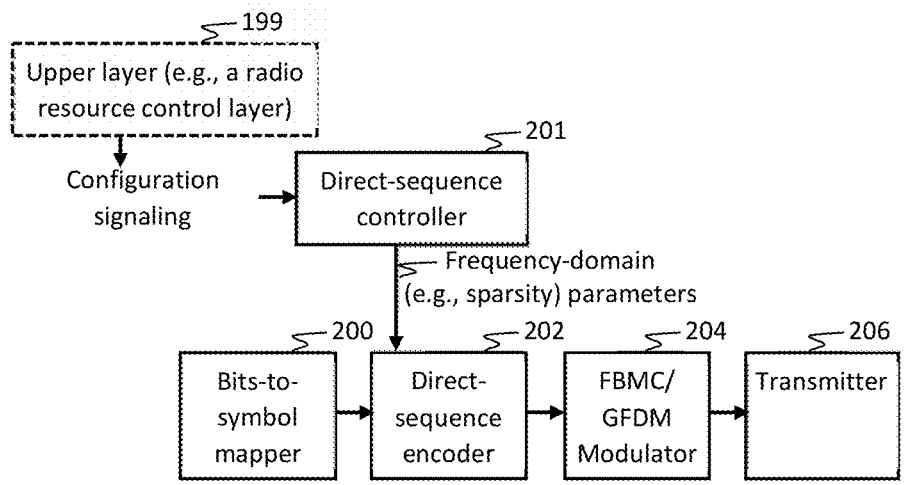

In FIG. 2L, the pulse-shaping filter 204 may include a GFDM or FBMC modulator. In one aspect, the filter 204 might employ a generic block-based filtered multicarrier scheme in which the energy of the data symbols is spread in time with a circularly shifted prototype filter. In some examples, subcarrier filters can avoid both ingress and egress noises.

Figure 2M:
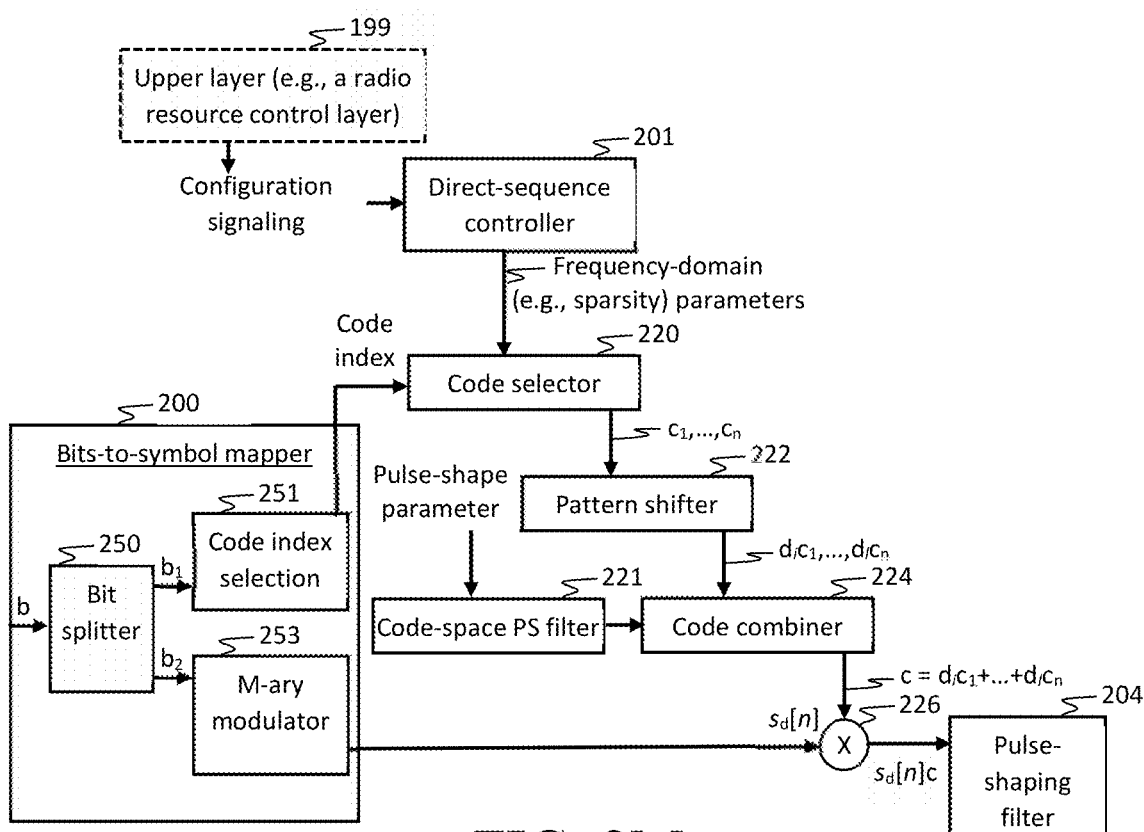

In FIG. 2M, the bits-to-symbols mapper 200 performs code-index modulation via a code index selector 251, which maps each pattern of bits $b_1$ to a code index. A bit splitter 250 provides a second set of bits $b_2$, to an M-ary modulator 253 that produces symbol values $s_d[n]$, which are modulated 226 onto the selected codewords c. In some aspects, a third set of bits (not shown) may be mapped to a frequency index, which frequency-shifts 222 the selected code to one of a set of indexed frequency-sparsity patterns. In another aspect, the second set of bits $b_2$ is mapped to one or more layer identifier values $s_2$, which can allow the receiver to distinguish one layer from another in received signals. This provides for code index modulation coupled with a modulation-domain multiple access (MDMA). Coupling these two approaches can facilitate a non-orthogonal grant-free access scheme supporting collision resolution based on QAM or PAM signature detection techniques on the receive side. The receiver detects the code index to determine what data values were transmitted and demodulates the codes (e.g., estimates 52) to determine which layer sent the data.

Figure 4A:
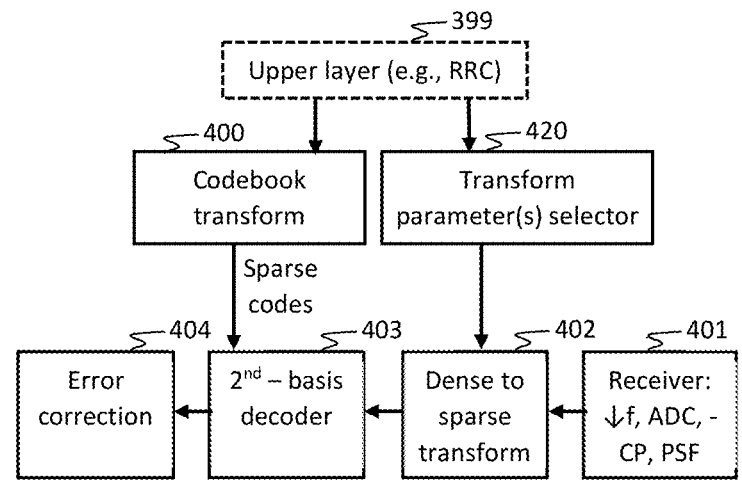
FIG. 4A is a diagram of a receiver and receiver method according to disclosed aspects. These aspects may be implemented by a computer processor or stored as software instructions in a non-transitory computer-readable memory.

In FIG. 4A, a receiver and receiving method comprises a receiver front-end 401, a transform 402, a decoder 403, and a FEC decoder 404. A transform-parameter selector 420 may select one or more transform parameters (e.g., block size, sampling frequency, sampling period, length of signal, and the like) used in the transform 402 to transform received signals from a first basis (the first basis being employed by the transmitter to produce original codewords, which are dense codewords) into a second basis (wherein transformed codewords are sparse, or more sparsely distributed, relative to the original codewords). Here, sparse means that the codeword is spread across fewer resources than a dense codeword. A codebook transform 400 may produce sparse codewords in the second basis, such as by transforming dense codewords in the first basis, and the sparse codewords (or their relationships, such as factor graphs) can be input to the decoder 403, wherein received transmissions can be decoded with respect to the second basis.

The RF front-end 401 can include an antenna, an amplifier, a frequency downconverter, an analog-to-digital converter (ADC) a cyclic-prefix remover, and/or a pulse-shaping filter. In accordance with an example receiver apparatus and method, a UE or TRP receiving device transforms 402 received transmissions from one or more transmitting devices (e.g., UEs and/or TRPs) into a plurality of resource samples in a transform space corresponding to the second basis. For example, a DFT (e.g., an FFT, a filter bank, or some other suitable transform) may transform a received discrete-time signal into frequency samples, the frequency domain being the transform space, and the output frequency bins being the second basis. Although the transmission(s) may be single-carrier (e.g., with a cyclic prefix) signals, the resource samples may be OFDM tones. The transform 402 may include a subcarrier demodulator, such as an OFDM demodulator. The transform 402 may equalize (not shown) the samples. For example, a frequency-domain equalizer (FDE) may apply a weighting matrix to subcarrier samples to equalize the channels between the one or more transmitting devices and the receiving device.

The transform-parameter selector 420 may select parameters for the resource samples produced by transform 402. The parameters may include the number of samples, the size of each sample, the spacing between samples, pulse shaping, and so on. Parameter selection 420 may be made upon determining (e.g., measuring or from the configuration signaling) physical parameters of the received waveform, the physical parameters corresponding to the first basis. Measurements might include measuring the received waveform in the first basis. Parameter selection 420 may be responsive to configuration signaling that provides information about the received waveform, which can be used to select 420 the parameters of the resource samples produced by the transform 402. The parameter selector 420 might measure one or more of the received direct-sequence signal's physical parameters (e.g., period length, number of periods, pulse width, pulse shape, duty cycle, roll-off factor, sample rate, cyclic prefix length, dynamic range, and so on) to determine signal attributes for the transformed signal (e.g., numerology, symbol length, number of physical resource blocks, number of subcarriers, number of slots per subframe, slot length, subcarrier bandwidth, subcarrier spacing, subcarrier pulse-shaping, total bandwidth, roll-off, OOB leakage suppression, and so on), and to configure the transform 402 to produce resource samples in the second basis according to the aforementioned signal attributes.

The receiving device might decode 403 the direct-sequence codewords based on direct-sequence codes known to be associated with the transmitting device(s), but by employing the frequency-domain transform 400 of the codebooks. By virtue of the direct-sequence codes being designed to produce frequency-domain NOMA sparsity patterns, decoding 403 might employ an SCMA decoder configured to use the frequency-domain transform of the direct-sequence codes associated with the transmitter(s) to perform joint detection of direct-sequence multiplexed layers, such as by using message passing algorithm (MPA) decoding. Sparsity of the codewords in the transform space (e.g., the second basis) can reduce the complexity of joint detection by facilitating an MPA. Each layer of SCMA, for example, has an associated codebook set, which may be expressed as both direct-sequence codes and their corresponding frequency-domain codes. The decoding 403 can exploit frequency-domain sparsity designed into the direct-sequence codes to reduce the complexity of joint detection. Decoding 403 can comprise demultiplexing the transmission layers, and data bits for each layer can be decoded 404 using an FEC decoder. As an example, a turbo decoder, an LDPC decoder, or a polar decoder may be used to decode 404 the data bits.

In some aspects, configuration signaling received from an upper layer 399 can assist the codebook transform 400 and/or the selection 420 of transform parameters. Spreading factor (SF) is a parameter that specifies a number of REs over which a signal is spread. In some situations, the signal is carried in a subset of the REs to provide for sparsity. For a direct-sequence code, the REs correspond to code chips or symbol positions in a block or sequence. In a discrete-time signal, REs can correspond to time-domain elements, such as chip intervals, symbol intervals, or slots, for example. REs might comprise pulse waveforms in a block of circular-shifted pulse waveforms. In the frequency domain, REs may be subcarrier frequencies, such as OFDM tones. A code might be selected to have a high SF in one domain and a low SF in another domain. For example, a direct-sequence code may be provisioned to have a low frequency-domain SF relative to its time-domain (or data-domain) SF. The configuration signaling can include an SF for use by a transmitter and/or receiver. In some examples, the SF corresponding to codewords in the first basis is used to select 420 the transform parameter(s), such as the transform size.

Overlay factor (OF) is a parameter that characterizes the ratio of the number of layers to the number of REs. Typically, higher OF may allow more layers to share REs, facilitating support for large numbers of active connections. If OF>1, NOMA is possible. The transmitter may select direct-sequence codes based on adaptation criteria that can include content and application, device capability, device requirements, spectrum sharing mechanism, network topology, channel condition, access mechanism, and the like, as examples. A unit performing adaptation may receive configuration signaling based on SF and OF parameters. In one example, a high time-domain (or data-domain) SF, a low frequency-domain SF, and an OF>1 that direct-sequence codes are to be provisioned that have sparse NOMA patterns in the frequency domain, and possibly low PAPR in the time-domain. The OF (and possibly other codeword relationship information, such as factor graphs) can be in the configuration signaling 399 (and/or determined by the codebook transform 400) and can be used in the decoder 403 to decode received codewords.

In one example, bits to be transmitted are encoded into direct-sequence codewords in a transmitter's encoder, modulated onto a first basis of orthogonal and/or non-orthogonal pulse waveforms, and transmitted, wherein the transmitted signals may be multiplexed in the channel. The receiver employs a second basis, which is different from the first basis in which the codewords were modulated, wherein the second basis provides codeword sparsity to facilitate detection. For example, the receiver can transform received direct-sequence encoded signals into the frequency domain, wherein the direct-sequence codes have been designed to be sparse, and detect these codewords by MPA over the corresponding factor graph. Thus, the transform 402 can demodulate the codewords with respect to a different basis than the basis used by the transmitter to modulate the codewords onto the transmission signal.

In one example, there are J separate layers, and each layer has a codebook $C_j$ containing M complex codewords, i.e., $C_j=\{c_{j1}, \ldots, c_{jM}\}$. In each layer, every $\log_2 M$ bits have been mapped into one codeword. The length of each codeword is K, and each codebook has few or no positions corresponding to zero values. Corresponding with the length of the codewords, there are K orthogonal resources (e.g., pulse waveforms, MIMO spatial layers, or other REs), which are the (e.g., first) basis, onto which the code (or encoded) symbols are modulated. Here, we assume K separate code symbols are modulated onto K orthogonal pulse waveforms of a block of circular-shifted pulse waveforms, the block length being an OFDM symbol length, and possibly including a cyclic prefix and/or suffix. The pulse waveforms are the first basis. The codewords are configured to filter the block of circular-shifted pulse waveforms such that the transmitted signal is sparse in the frequency domain and has a layer-specific NOMA OFDM sparsity pattern.

Based on parameters of the pulse waveforms (e.g., pulse width, block length, and possibly others), a set of frequencies or OFDM tones is selected as the second basis, in which the receiver demodulates 402 received transmissions. In this example, each codeword has a frequency-domain pattern, $f_{jm}=(f_{1jm}, \ldots, f_{Kjm})^T$, where each code in the $j^{th}$ codebook has the same ($j^{th}$) OFDM sparsity pattern in which K-N OFDM subcarriers are zero, and each codebook may have a unique sparsity pattern (although in some instances, codebook reuse may be employed).

The $j^{th}$ frequency-domain pattern will be affected by the channel vector, $$h_j = \{h_{kj}\}_{k=1}^K.$$

Thus the received signal is:

$$y = \sum_{j=1}^{J} \text{diag}(h_j) f_j + n$$

where $\text{diag}(h_j)$ is a diagonal matrix wherein its $j^{th}$ diagonal element is $h_j$, $f_j=(f_{1j}, \ldots, f_{Kj})^T$ is the $j^{th}$ frequency-domain pattern, and n is complex Gaussian noise. OF=J/K.

The decoder 403 detects the transmitted codewords according to the received signal y, the channel knowledge, and the factor graph, which is formed by the relation between layers and resources. The structures of factor graphs represent constraints, and the messages in MPA can be updated based on the constraints. By changing the basis of the codewords, the transform 402 changes the factor graph. Here, the resources have been transformed 402 from circular pulse waveforms to OFDM subcarriers. For each codebook, the frequency-domain pattern of each codeword has non-zero values in the same N positions, which means the bits in that layer are spread in only N resources.

Figure 5A:
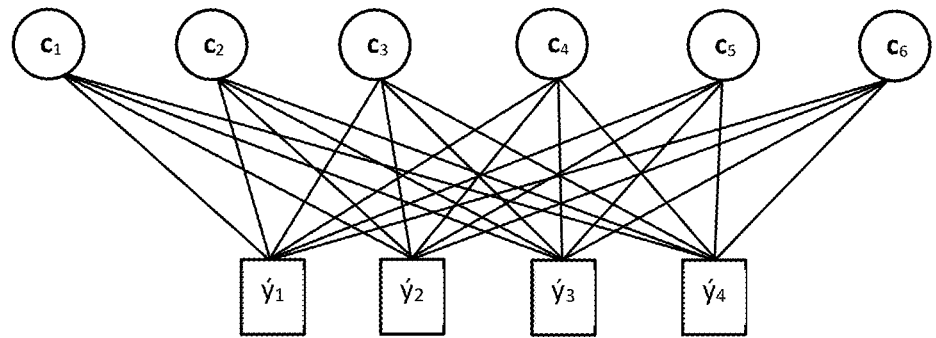
FIGS. 5A and 5B are example factor graphs for codewords disclosed herein.
Figure 5B:
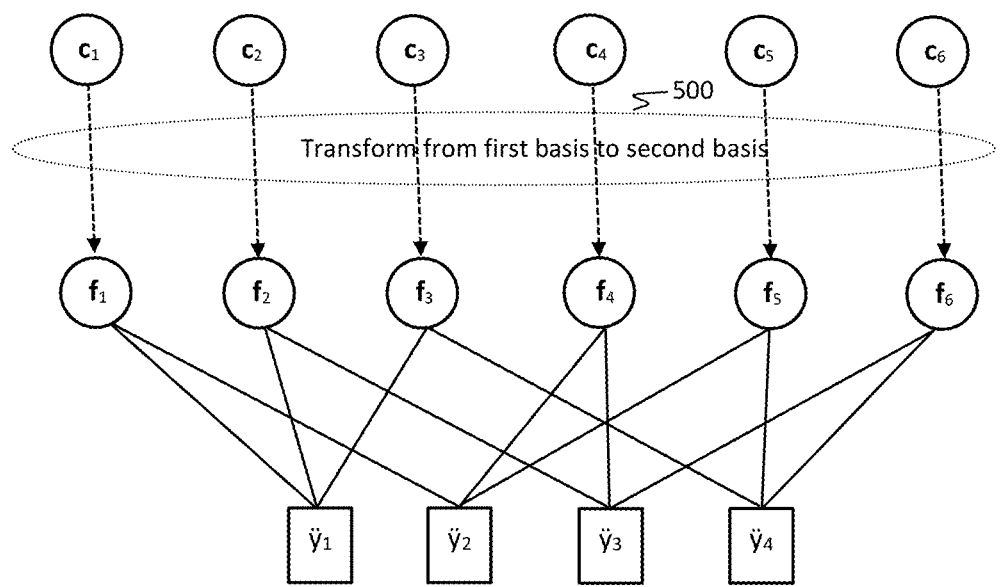

In FIG. 5A, a factor graph illustrates a dense relationship between layer nodes corresponding to a set of direct-sequence codes or codebooks $c_1$-$c_6$, and resource nodes $\dot{y}_1$-$\dot{y}_4$ corresponding to a first basis (e.g., orthogonal pulse waveform functions). In FIG. 5B, a transform 500 is performed on the direct-sequence codes $c_1$-$c_6$ by the receiver to change the resource nodes to transformed resource nodes $f_1$-$f_6$ and provide for a second basis $\ddot{y}_1$-$\ddot{y}_4$ which has a sparse relationship with the transformed resource nodes $f_1$-$f_6$ (e.g., an OFDM sparsity pattern). The receiver may be responsive to waveform parameters (e.g., symbol length, pulse width, number of pulses, pulse-shape parameter(s), and so on) for selecting transform parameters (e.g., transform size, sampling rate, pulse-shape filter parameters, and so on). The receiver may detect and/or receive the waveform parameters (e.g., in the configuration signaling).

In the factor graph illustrated in FIG. 5B, J=6, K=4, N=2, and $d_f$=3. The three edges connected with the first resource node indicates the constraint, $h_{11}f_1+h_{21}f_2+h_{31}f_3+n=y_1$, where $h_{i1}$ is an element of $h_1$, $f_i$ is the first element of the $i^{th}$ frequency-domain pattern (e.g., the codeword represented in the new basis): $\{f_{im}\}_{m=1}^{M}$, n is noise, and $y_1$ is the measured value at the first resource node corresponding to the second basis. In each iteration, the MPA detector 403 can deduce the probability distribution of $f_1$ according to $f_2, f_3$ and $y_1$. In one example, the K resource nodes in the factor graph may have the same degree $d_f$. Under this assumption the following MPA detection algorithm may be performed:

---

Input: y, $\{h_j\}_{j=1}^J$, $\{c_j\}_{j=1}^J$, $N_0$
Change basis of codebook(s): $\{C_j\}_{j=1}^J \rightarrow \{F_j\}_{j=1}^J$
Initialize: $V_{j \rightarrow k}^{(0)}(f_{jm}) = 1/M$, ($j \in [J]$, $k \in [K]$, $m \in [M]$)
for t = 1: $N_t$
  % update messages from resource nodes
  for all $j \in [J]$, $k \in [K]$, $m \in [M]$ such that Edge(j,k) exists in factor graph $$U_{j \rightarrow k}^{(t)}(f_{jm}) = \sum_{c \in com} \frac{1}{\pi N_0} \exp\left[-\frac{1}{N_0}\left|y_k - h_{kj}f_{kjm} - \sum_{i \in \partial k \backslash j} h_{ki}\gamma_{ik}\right|^2\right] \prod_{i \in \partial k \backslash j} V_{i \rightarrow k}^{(t-1)}(\gamma_i);$$

% where com = $F_{i1} \times \ldots \times F_{idf-1}$ is the Cartesian Product of the "new basis" codebooks of the other
% $d_f - 1$ variable nodes connected to the kth function node: e.g., $i \in \partial k \backslash j$, $\gamma = (\gamma_{i1}, \ldots, \gamma_{idf-1})$ is

```
% one element of com, and γ_j = {γ_ik}_{k=1}^K
   end
% Update messages from layer nodes
   for all j ∈ [J], k ∈ [K], m ∈ [M] such that Edge(j,k) exists in factor graph
      V_{j→k}^{(t)}(f_{jm}) = Π_{l∈∂j\k} U_{l→k}^{(t)}(f_{jm})
   end
% Normalize probabilities for numerical stability
   for all j ∈ [J], k ∈ [K], m ∈ [M] such that Edge(j,k) exists in factor graph
      V_{j→k}^{(t)}(f_{jm}) = V_{j→k}^{(t)}(f_{jm})/Σ_{m'=1}^M V_{j→k}^{(t)}(f_{jm'})
   end
end
% Make decision after some number of iterations
for j=1:J, m=1:M
   V_j(f_{jm}) = Π_{k∈∂j\k} U_{k→j}^{(N_t)}(f_{jm})
end
f_{jm"} = f_decision(V_j, {f_{jm}}_{m=1}^M); % returns codeword that maximize V_j( ),
``` where $U_{j\to k}^{(t)}(f_{jm})$, is the probability distribution of the $j^{th}$ layer node according to the $k^{th}$ resource node and the rest $(d_f-1)$ of the adjacent layer nodes. The term $$\frac{1}{\pi N_0}\exp[]$$

provides the probability that the transmitted codeword in the $j^{th}$ layer is $f_{jm}$ in the condition that the rest $(d_f-1)$ of the adjacent layer nodes are according to $\gamma$, i.e., $P(f_{jm}|\gamma)$. $V_{i\to k}^{(t-1)}(\gamma_i)$ is the probability that the codeword from the $i^{th}$ layer is $\gamma_i$, i.e., $P(\gamma_i)$, The product of these parts is the joint probability $P(f_{jm},\gamma)$. Thus, $P(f_{jm})$ can be computed as a traversal on the set corn.

Optimizations to the receiver method can reduce the complexity per resource node. Early termination may be based on convergence behavior of the MPA. The decoder may adjust beliefs according to the variation trend. Numerical analyses may be performed for conditional probability approximation, which can avoid squares and divisions. Log-likelihood ratio (LLR) can replace multiplications with additions. In partial marginalized (PM) MPA, some symbols are judged in advance. Various techniques can reduce the complexity of maximum a posterior (MAP) detection. Tailoring the edges in the Forney factor graph can reduce collisions on each resource. Sphere decoding may be used to reduce the complexity of maximum likelihood (ML) detection. Node pruning may be used. Mixed-decision (hard and soft) updating during the MPA iterations can be performed. The receiver can employ successive interference cancellation (SIC), multi-user detection (MUD). Various aspects can employ artificial neural networks (ANNs), such as deep learning neural networks, convolutional neural networks, multi-layer perceptrons (MLPs), recursive neural networks (RNNs), recurrent neural networks, bi-directional RNNs, Long Short-Term Memory (LSTM) networks, Gated Recurrent Unit (GRU) networks, Convolutional Neural Networks (CNNs), and others. Codebook design can employ an ANN. A decoder might employ an ANN. It should be appreciated that the receiver shown in FIG. 4A can be adapted for MIMO reception. The receiver may be adapted according to any of the transmitter types disclosed herein, including, but not limited to GFDM and FBMC.

In one configuration, an apparatus for wireless communication includes means for receiving (e.g., a radio receiver 401) a transmission from a transmitting device, the transmission comprising an original codeword generated in a first basis by the transmitting device. A means for transforming (e.g., a linear transformation 402) transforms the original codeword from the first basis to a second basis to produce a transformed codeword, the second basis being different from the first basis. The transformed codeword is more sparsely distributed than the original codeword. A means for decoding (e.g., a joint detection decoder 403, such as an MPA decoder) performs joint detection of multiplexed layers in received transmissions, such as by employing relationships between different transformed codewords.

In another configuration, an apparatus for wireless communication includes means for transforming (e.g., 402) an original codeword in a received signal from a first basis to a second basis to produce a transformed codeword, wherein the original codeword was produced in the first basis by a transmitting device, the original codeword having a first number of non-zero values. The transformed codeword has a second number of non-zero values, the second number being smaller than the first number. A means for decoding (e.g., 403) performs joint detection of multiplexed layers in the received transmissions.

In one aspect, the first basis comprises a block of pulse waveforms, and the second basis comprises a set of subcarrier frequencies. The transformed codeword may have a frequency-domain NOMA sparsity pattern. The means for decoding can be configured to decode one of index-modulated signals and M-ary modulated codewords. The means for decoding might employ at least one factor graph corresponding to the transformed codeword to perform joint detection. The means for transforming can comprises a Fourier transform (e.g., a DFT, DTFT, or an IFFT), a filter bank, and/or a demodulator. The transmissions may include single-carrier-with-cyclic-prefix signals. The means for transforming may comprise a means for equalizing transformed signals, such as an FDE. The apparatus may further comprise means for FEC decoding (e.g., decoder 404) for decoding data bits. A means for transform parameter selection (e.g., transform parameter selector 420) may receive configuration signaling to select linear transformation parameters in the means for transforming (402).

Figure 4B:
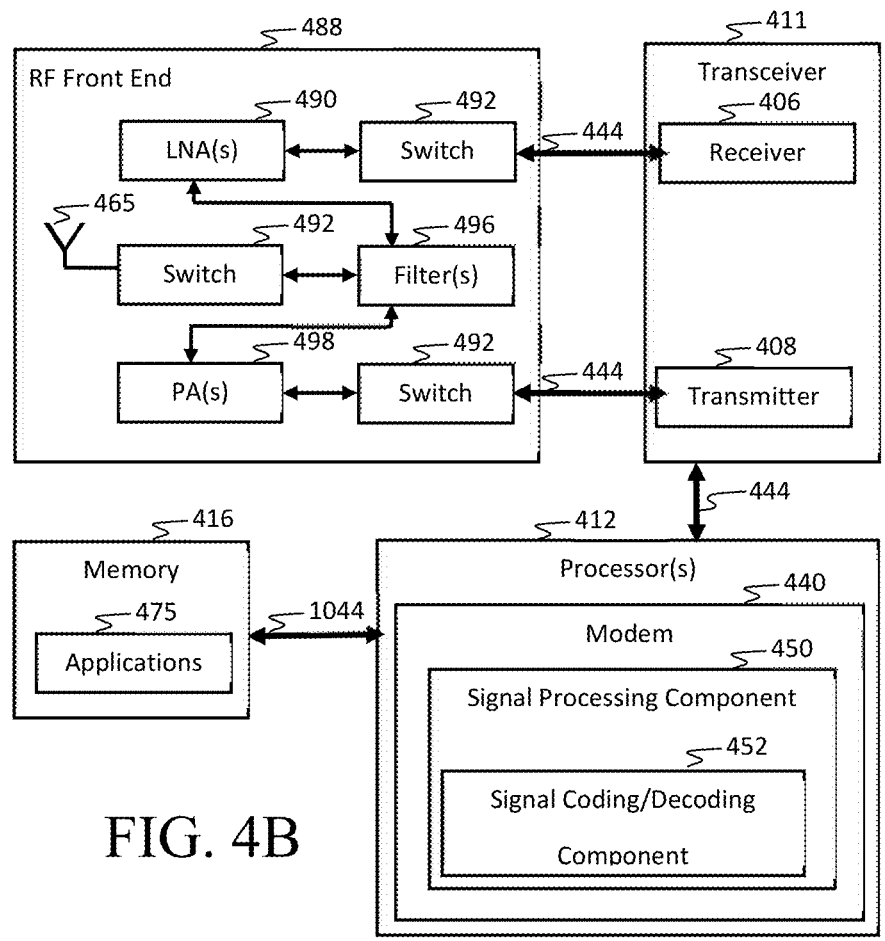
FIG. 4B is a diagram of a transceiver that can be configured to operate according to disclosed aspects.

FIG. 4B is an example implementation of a UE or TRP, which may include a variety of components, such as one or more processors 412, memory 416, and transceiver 411 in communication via one or more buses 444, which may operate in conjunction with modem 440, signal processing component 450, and signal coding/decoding component 452 to enable one or more of the functions described herein. The one or more processors 412, modem 414, memory 416, transceiver 411, RF front end 488, and one or more antennas 486 may be configured to support communications in one or more radio access technologies. The RF front end 488, transmitter 408, and modem 440 may comprise or form at least a portion of means for transmitting a communication signal. At least one of the RF front end 488, receiver 408, and modem 440 may comprise or form a portion of means for receiving a communication signal.

The various functions related to signal processing component 450 and signal coding/decoding component 452 may be included in modem 440 and/or processors 412 and may be executed by a single processor or multiple processors. Memory 416 may be configured to store data used herein and/or local versions of applications 475 or signal processing component 450 and/or one or more of its subcomponents being executed by at least one processor 412. Memory 416 can include any type of computer-readable medium usable by a computer or at least one processor 412, such as random access memory (RAM), read only memory (ROM), tapes, magnetic discs, optical discs, volatile memory, non-volatile memory, and any combination thereof. In an aspect, for example, memory 416 may be a non-transitory computer-readable storage medium that stores one or more computer-executable codes defining signal processing component 450 and/or one or more of its subcomponents, and/or data associated therewith, when the UE or TRP is operating at least one processor 412 to execute signal processing component 450 and/or one or more of its subcomponents.

Transmitter 408 and/or receiver 406 may include hardware, firmware, and/or software code executable by a processor, the code comprising instructions and being stored in a memory. The RF front end 488, may provide for receiving and transmitting radio transmissions, may include one or more low-noise amplifiers (LNAs) 490, one or more switches 492, one or more power amplifiers (PAs) 498, and one or more filters 496 for transmitting and receiving RF signals. The RF front end 488 can use one or more switches 492 to select a transmit or receive path using a specified filter 496, LNA 490, and/or PA 498, based on a configuration as specified by transceiver 411 and/or processor 412.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more."

Unless stated otherwise, the term "some" refers to one or more. Combinations, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims.

The invention claimed is:

1. A method of communication by a wireless device configured for communicating in a wireless network, comprising:
    selecting at least one direct-sequence code corresponding to a layer or a data symbol; and
    modulating a block of pulse waveforms with the at least one direct-sequence code to produce a discrete-time signal;
    wherein the at least one direct-sequence code provides the discrete-time signal with a frequency-domain sparsity pattern configured for non-orthogonal multiple access (NOMA).

2. The method of claim 1, wherein selecting comprises: adjusting the at least one direct-sequence code to effect a change in at least one of the discrete-time signal's frequency-domain properties; or combining a plurality of direct-sequence codes to provide the at least one direct-sequence code with the frequency-domain sparsity pattern or to provide the discrete-time signal with a low peak-to-average-power ratio.

3. The method of claim 1, wherein modulating comprises: selecting at least one physical parameter of the block of pulse waveforms to provide at least one signal attribute to the discrete-time signal; the at least one physical parameter comprising period, number of periods, pulse width, pulse shape, roll-off factor, or sample rate; and the at least one signal attribute comprising numerology, symbol length, number of physical resource blocks, number of subcarriers, number of slots per subframe, slot length, peak-to-average-power ratio, total bandwidth, subcarrier bandwidth, subcarrier spacing, subcarrier pulse-shaping, duty cycle, roll-off, out-of-band leakage, cyclic prefix length, or cyclic suffix length.

4. The method of claim 1, wherein modulating comprises: selecting a prototype pulse waveform having a spectrum comprising a plurality of subcarrier frequencies; modulating a symbol from the at least one direct-sequence code onto each of a plurality of waveforms based on the prototype pulse waveform, to generate a plurality of modulated waveforms; and combining the modulated waveforms to produce the block of pulse waveforms.

5. The method of claim 1, wherein at least one of selecting and modulating is responsive to configuration signaling received from an upper layer.

6. The method of claim 1, further comprising pulse-shape filtering the at least one direct-sequence code; or spreading data symbols to be modulated onto the at least one direct-sequence code.

7. The method of claim 1, wherein the discrete-time signal is an orthogonal frequency division multiplexing (OFDM), a filter bank multi-carrier (FBMC), a generalized frequency division multiplexing (GFDM), a super-position coding NOMA (SPC-NOMA), a sparse code multiple access (SCMA), a pattern division multiple access (PDMA), or an interleave division multiple access (IDMA) signal.

8. An apparatus for wireless communication, comprising: a non-transitory computer-readable memory; and at least one processor coupled to the non-transitory computer-readable memory and configured for:
  selecting at least one direct-sequence code corresponding to a layer or a data symbol; and
  modulating a block of pulse waveforms with the at least one direct-sequence code to produce a discrete-time signal;
  wherein the at least one direct-sequence code provides the discrete-time signal with a frequency-domain sparsity pattern configured for non-orthogonal multiple access (NOMA).

9. The apparatus of claim 8, wherein selecting comprises: adjusting the at least one direct-sequence code to effect a change in at least one of the discrete-time signal's frequency-domain properties; or combining a plurality of direct-sequence codes to provide the at least one direct-sequence code with the frequency-domain sparsity pattern or to provide the discrete-time signal with a low peak-to-average-power ratio.

10. The apparatus of claim 8, wherein modulating comprises: selecting at least one physical parameter of the block of pulse waveforms to provide at least one signal attribute to the discrete-time signal; the at least one physical parameter comprising period, number of periods, pulse width, pulse shape, roll-off factor, or sample rate; and the at least one signal attribute comprising numerology, symbol length, number of physical resource blocks, number of subcarriers, number of slots per subframe, slot length, peak-to-average-power ratio, total bandwidth, subcarrier bandwidth, subcarrier spacing, subcarrier pulse-shaping, duty cycle, roll-off, out-of-band leakage, cyclic prefix length, or cyclic suffix length.

11. The apparatus of claim 8, wherein modulating comprises: selecting a prototype pulse waveform having a spectrum comprising a plurality of subcarrier frequencies; modulating a symbol from the at least one direct-sequence code onto each of a plurality of waveforms based on the prototype pulse waveform, to generate a plurality of modulated waveforms; and combining the modulated waveforms to produce the block of pulse waveforms.

12. The apparatus of claim 8, wherein at least one of selecting and modulating is responsive to configuration signaling received from an upper layer.

13. The apparatus of claim 8, wherein the at least one processor is configured for pulse-shape filtering the at least one direct-sequence code; or spreading data symbols to be modulated onto the at least one direct-sequence code.

14. The apparatus of claim 8, wherein the discrete-time signal is an orthogonal frequency division multiplexing (OFDM), a filter bank multi-carrier (FBMC), a generalized frequency division multiplexing (GFDM), a super-position coding NOMA (SPC-NOMA), a sparse code multiple access (SCMA), a pattern division multiple access (PDMA), or an interleave division multiple access (IDMA) signal.

15. An apparatus for wireless communication, comprising:
  a direct-sequence controller for selecting at least one direct-sequence code corresponding to a layer or a data symbol;
  a pulse-shaping filter for generating a block of circular-shifted pulse waveforms; and
  a modulator for modulating the block with the at least one direct-sequence code to produce a discrete-time signal;
  wherein the at least one direct-sequence code provides the discrete-time signal with a frequency-domain sparsity pattern configured for non-orthogonal multiple access (NOMA).

16. The apparatus of claim 15, wherein the direct-sequence controller is configured for: adjusting the at least one direct-sequence code to effect a change in at least one of the discrete-time signal's frequency-domain properties; or combining a plurality of direct-sequence codes to provide the at least one direct-sequence code with the frequency-domain sparsity pattern or to provide the discrete-time signal with a low peak-to-average-power ratio.

17. The apparatus of claim 15, wherein the pulse-shaping filter selects at least one physical parameter of the block of pulse waveforms to provide at least one signal attribute to the discrete-time signal; the at least one physical parameter comprising period, number of periods, pulse width, pulse shape, roll-off factor, or sample rate; and the at least one signal attribute comprising numerology, symbol length, number of physical resource blocks, number of subcarriers, number of slots per subframe, slot length, peak-to-average-power ratio, total bandwidth, subcarrier bandwidth, subcarrier spacing, subcarrier pulse-shaping, duty cycle, roll-off, out-of-band leakage, cyclic prefix length, or cyclic suffix length.

18. The apparatus of claim 15, wherein the pulse-shaping filter selects a prototype pulse waveform having a spectrum comprising a plurality of subcarrier frequencies; and the modulator modulates a symbol from the at least one direct-sequence code onto each of a plurality of waveforms based on the prototype pulse waveform, to generate a plurality of modulated waveforms; and wherein the modulated waveforms are combined by the modulator or the pulse-shaping filter to produce the block of pulse waveforms.

19. The apparatus of claim 15, wherein at least one of the direct-sequence controller and modulator is responsive to configuration signaling received from an upper layer.

20. The apparatus of claim 15, further comprising at least one filter configured for pulse-shape filtering the at least one direct-sequence code, or spreading data symbols to be modulated onto the at least one direct-sequence code.

21. The apparatus of claim 15, wherein the discrete-time signal is an orthogonal frequency division multiplexing (OFDM), a filter bank multi-carrier (FBMC), a generalized frequency division multiplexing (GFDM), a super-position coding NOMA (SPC-NOMA), a sparse code multiple access (SCMA), a pattern division multiple access (PDMA), or an interleave division multiple access (IDMA) signal.

* * * * *